Aug. 27, 1968  C. STELZER  3,398,753
METHOD AND APPARATUS FOR ASSEMBLING MOUTHPIECES
WITH TOBACCO RODS
Filed Dec. 7, 1965  10 Sheets-Sheet 1
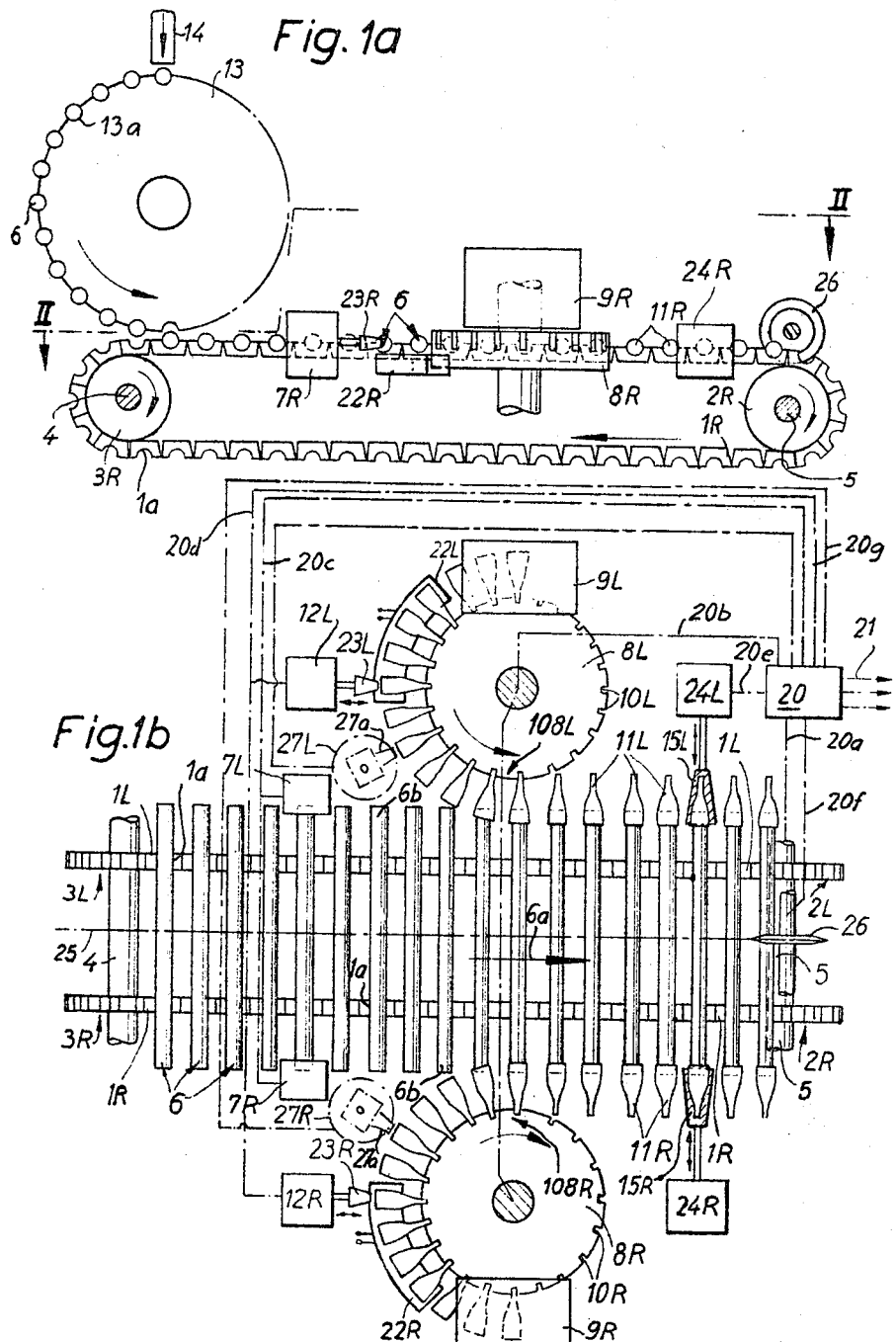
INVENTOR.
Carl Stelzer
BY
Michael J. Striker

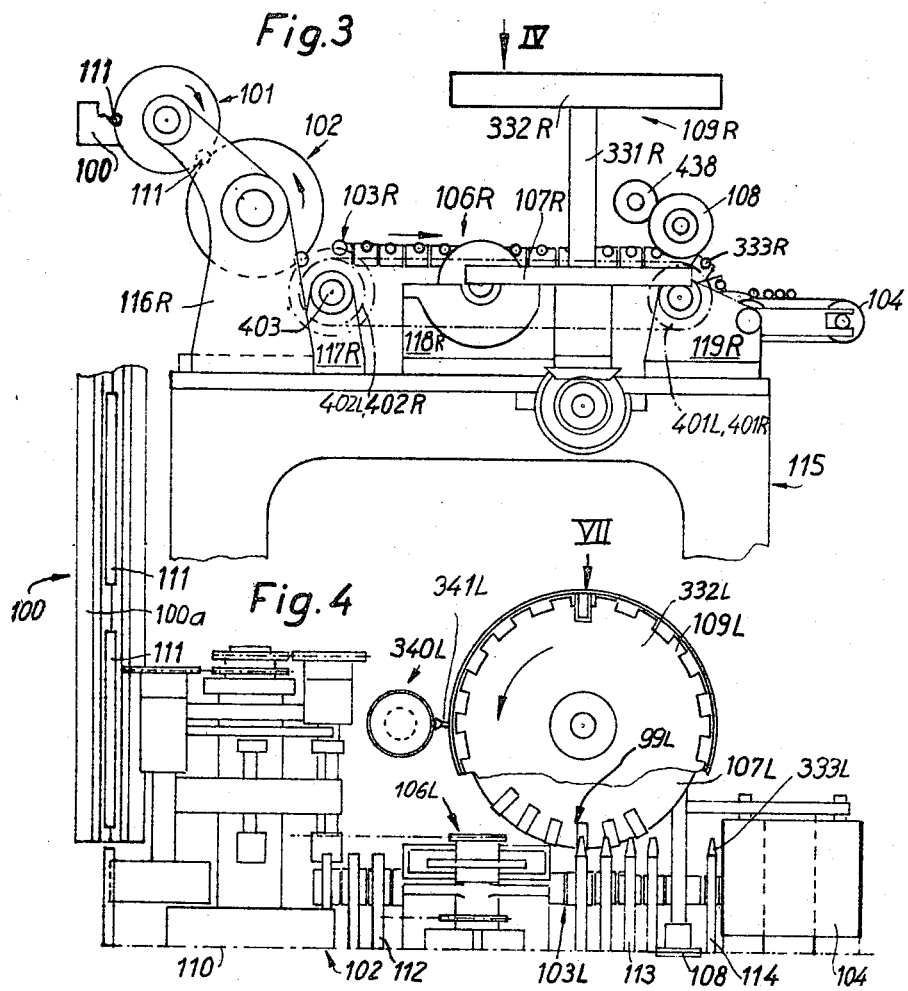
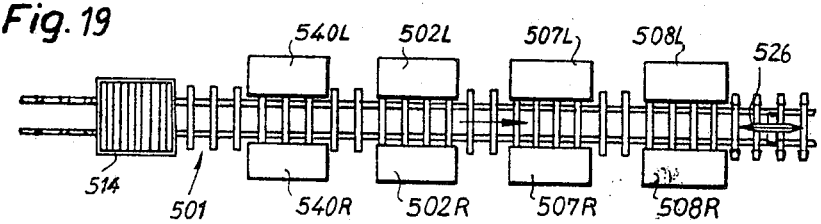

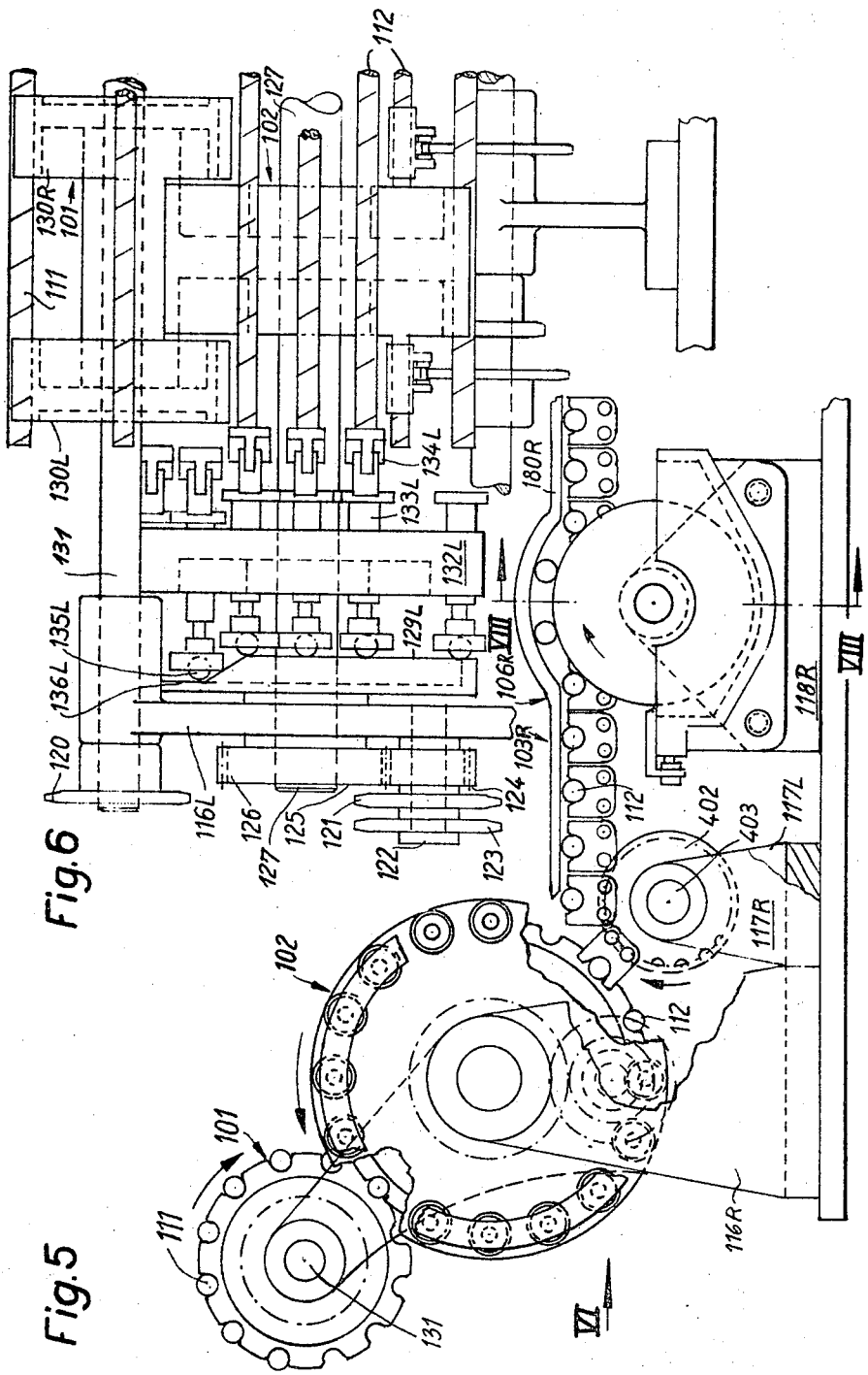

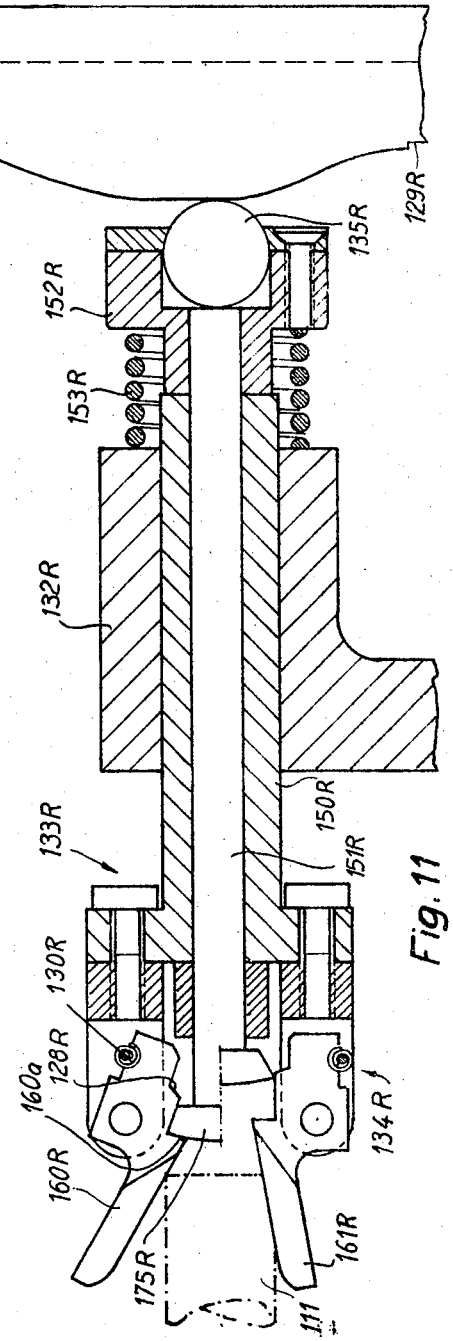
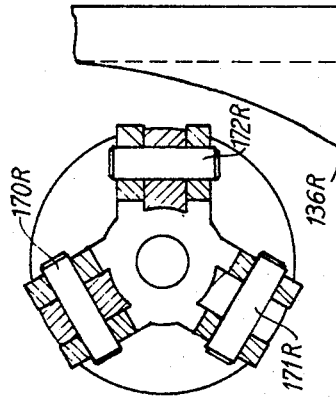
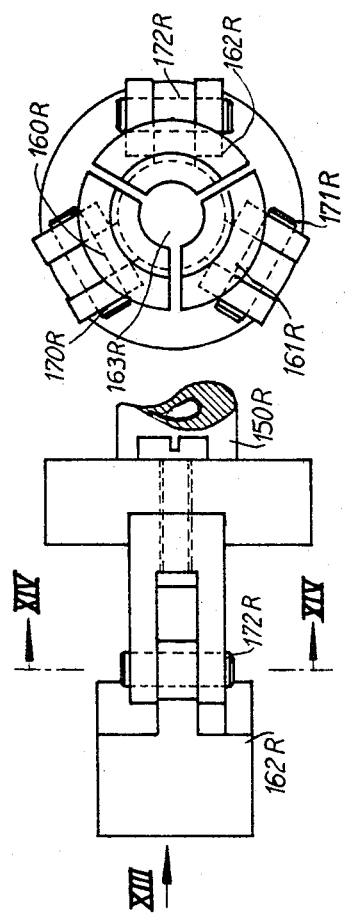
Fig. 11  Fig. 12  Fig. 13  Fig. 14
INVENTOR.
Carl Stelzer
BY
Michael J. Striker

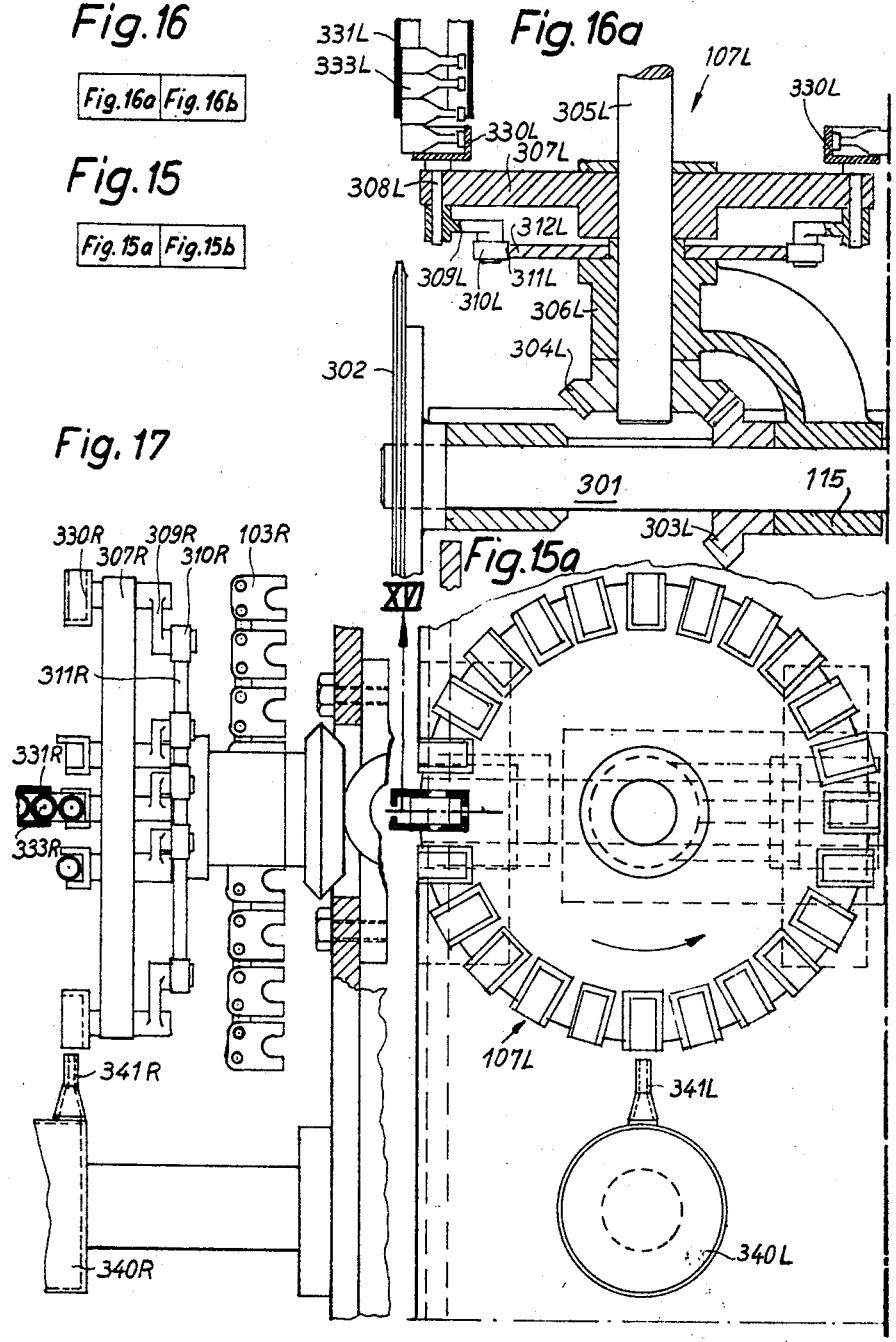

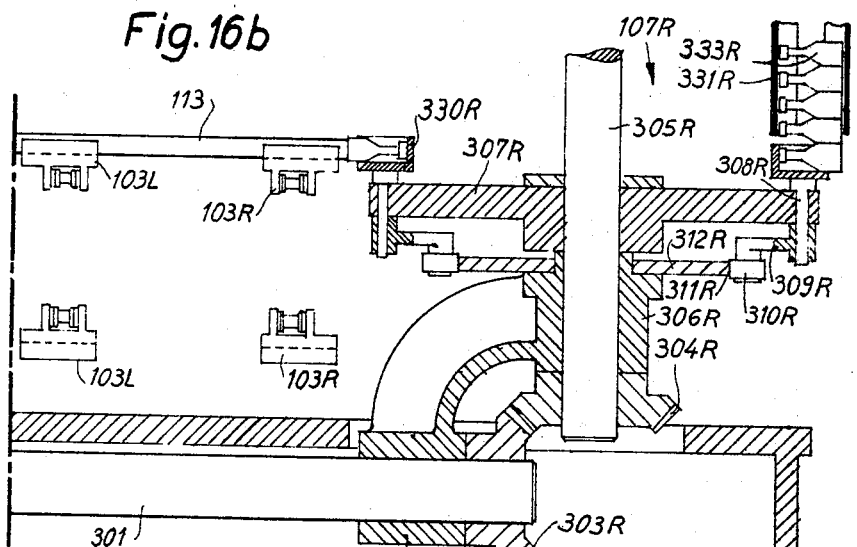
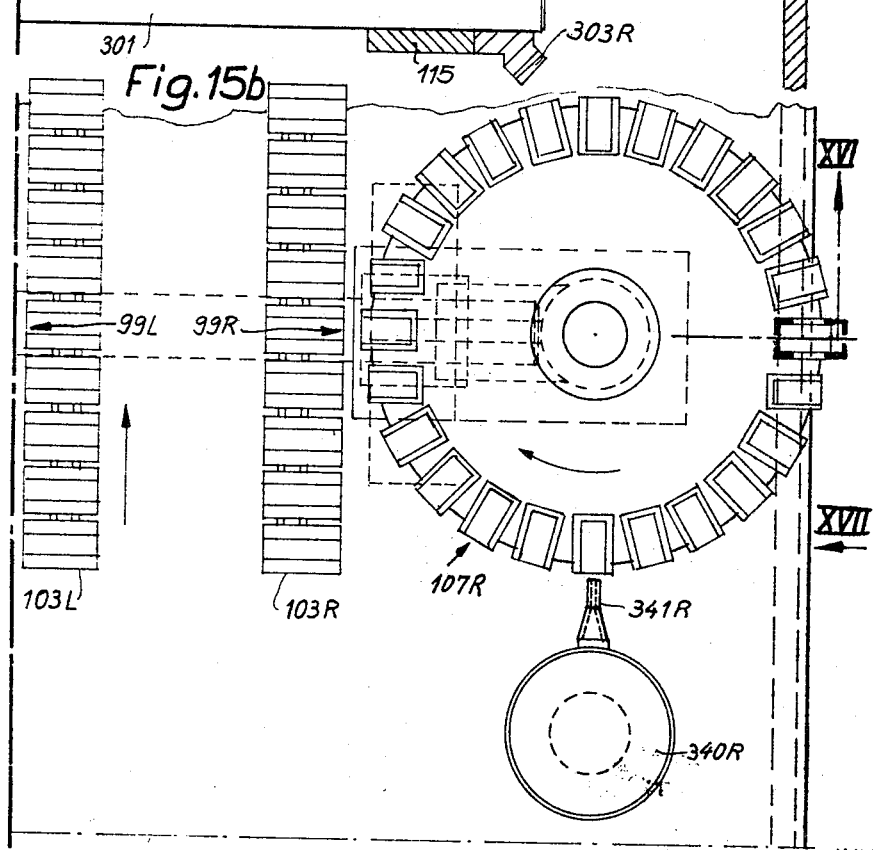

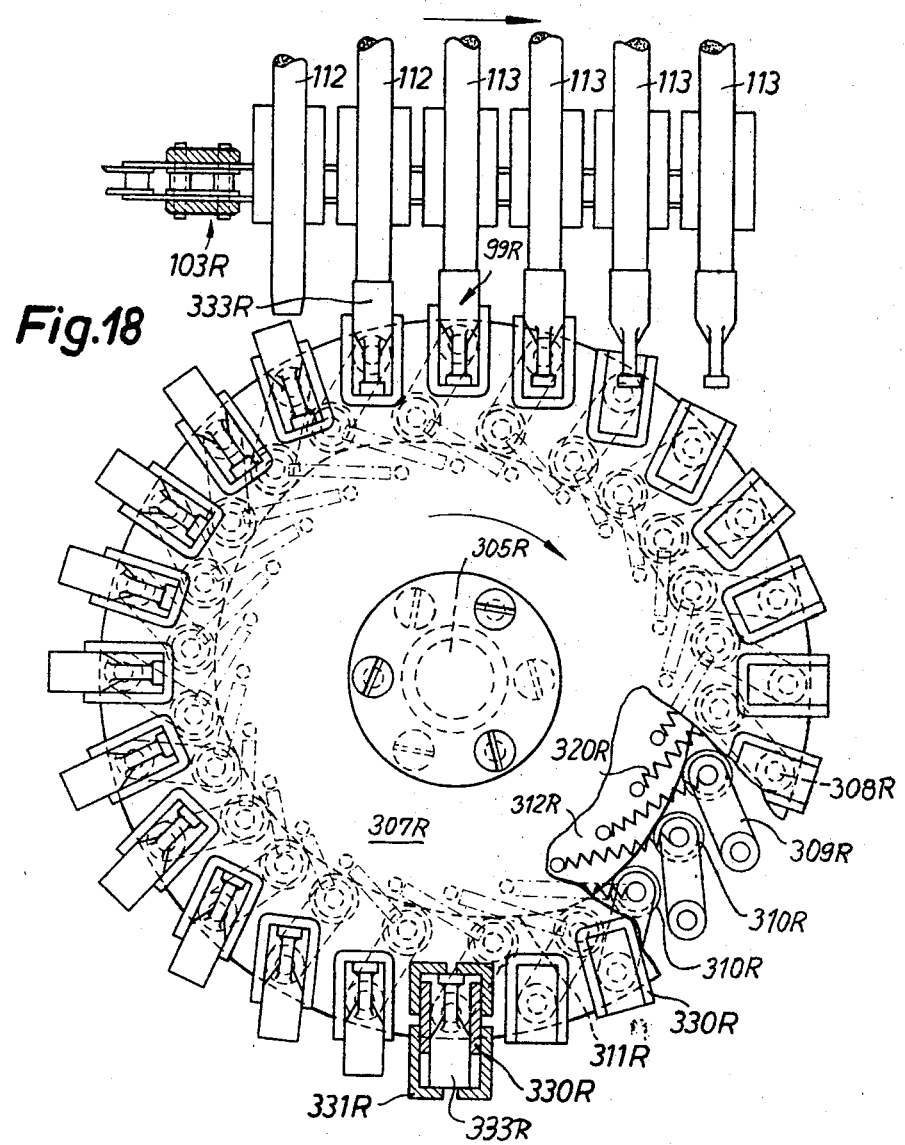

United States Patent Office 3,398,753
Patented Aug. 27, 1968

3,398,753
METHOD AND APPARATUS FOR ASSEMBLING MOUTHPIECES WITH TOBACCO RODS
Carl Stelzer, Reinbek, near Hamburg, Germany, assignor to Hauni-Werke Koerber and Co. K.G., Hamburg-Bergedorf, Germany
Filed Dec. 7, 1965, Ser. No. 512,144
Claims priority, application Germany, Dec. 7, 1964, H 54,492, H 54,493; June 19, 1965, H 56,345
39 Claims. (Cl. 131—88)

The present invention relates to a method and apparatus for assembling mouthpieces with tobacco rods. More particularly, the invention relates to a method and apparatus for assembling mouthpieces which preferably consist of synthetic thermoplastic material with unit-length or multiple-unit-length sections of cigarette rods, cigar rods, cigarillo rods or other types of rods wherein a filler consisting of or containing tobacco particles is surrounded by one or more tubular wrappers. The wrappers may consist of cigarette paper, tobacco foil, tobacco leaves or any other material which is suitable for such purposes. The tobacco rods which may be treated in the apparatus of the present invention may be of constant diameter from end to end or they may be provided with conical, rounded or otherwise configurated extremities.

It is already known to assemble mouthpieces with tobacco rods by moving the rods on an intermittently operated conveyor and by arresting the conveyor whenever a single mouthpiece or a group of mouthpieces is forcibly applied to the extremities of a corresponding number of tobacco rods. A serious drawback of such apparatus is that their output is rather low and also that the tobacco rods are subjected to considerable deforming stresses because the mouthpieces are applied by exertion of a substantial force which is likely to cause excessive deformation, tearing of wrappers, or complete destruction of the rods.

Accordingly, it is an important object of the present invention to provide a novel apparatus for assembling tobacco rods with mouthpieces in such a way that the rods and the mouthpieces may remain in motion during actual application of mouthpieces thereto.

Another object of the invention is to provide an apparatus of the just outlined characteristics wherein the mouthpieces are applied in such a way that the material of the tobacco rods is not subjected to excessive axial and/or radial stresses.

A further object of the invention is to provide an apparatus for assembling tobacco rods of multiple unit length with mouthpieces in such a way that each rod may be provided with a pair of mouthpieces in a simultaneous operation and without necessitating undue compression or other deformation of the tobacco filler and/or wrapper.

An additional object of the invention is to provide a novel system of conveyors which may be utilized in an apparatus of the above outlined characteristics.

A concomitant object of the invention is to provide novel pasting or adhesive applying devices which may be used in the improved apparatus.

An ancillary object of the invention is to provide a novel tobacco rod molding device which may be used in the improved apparatus.

Still another object of the invention is to provide a fully automatic apparatus for assembling tobacco rods with mouthpieces and to construct the apparatus in such a way that the connections between consecutive tobacco rods and the respective mouthpieces are of identical shape and strength.

A further object of the invention is to provide an apparatus which may be converted for assembling of tobacco rods with one or two mouthpieces at a time.

An additional object of the instant invention is to provide an apparatus of the above outlined characteristics which may be readily coupled to existing continuous cigarette rod or cigar rod making machines and is capable of assembling tobacco rods with mouthpieces at the same rate at which the rods issue from such machine or machines.

Another object of the present invention is to provide a method according to which tobacco rods and mouthpieces may be assembled in a continuous operation without necessitating interruptions in the feed of either component.

An additional object of the invention is to provide a method of the just outlined characteristics according to which the assembling step may be accompanied by the step of firmly connecting the mouthpieces with the respective tobacco rods without causing damage to and/or undue deformation of the wrapper.

A further object of the invention is to provide a method according to which the connection between each mouthpiece and the respective tobacco rod is established in a fully automatic way without necessitating any special steps or instrumentalities for such operation.

Still another object of the invention is to provide a method of joining mouthpieces with tobacco rods in such a way that the maximum diameter of the mouthpiece equals the maximum diameter of the respective tobacco rod.

Briefly stated, one feature of my invention resides in the provision of a method of assembling two types of prefabricated articles which respectively constitute mouthpieces and wrapped tobacco rods. The method comprises the steps of moving one article of each type sideways and in axial alignment with each other, and moving at least one of the two articles axially toward the other article so that one extremity of the tobacco rod enters the adjoining end of the mouthpiece. Such method of assembling the mouthpieces with the tobacco rods rends it possible to move the two types of articles continuously and preferably at a constant speed while the one article moves axially toward the other article. In other words, at least one of the articles can perform a composite movement which includes movement in a direction at right angles to its axis and movement in the axial direction. As a rule, it is the mouthpiece which is moved axially toward the respective extremity of the tobacco rod, particularly if the tobacco rods are of multiple unit length and if such rods are assembled with two mouthpieces at a time. In such operations, a second mouthpiece is moved sideways and in axial alignment with the tobacco rod so that the latter is located between the two mouthpieces, and the second mouthpiece is then moved axially toward the tobacco rod, preferably at the same rate as the first mouthpiece so that the other extremity of the tobacco rod enters the end of the second mouthpiece. If the tobacco rods are of double unit length, they may be severed midway between their extremities so that each rod yields two sections of unit length each of which is assembled with a mouthpiece and each of which constitutes a finished cigarette, cigar, cigarillo or cheroot.

If the internal diameter of the prefabricated mouthpiece exceeds the diameter of the corresponding extremity of the tobacco rod, one of the diameters is changed to such an extent that, after assembly, the extremity fits snugly into the end of and is thereby connected with the mouthpiece. This can be achieved in a number of ways. For example, if the internal diameter of the mouthpiece end is less than the diameter of the corresponding extremity of the tobacco rod, the extremity may be compressed or molded to effect a temporary reduction in the diameter of such extremity during entry into the mouthpiece end. Once the two articles are properly assembled, the innate elasticity of the filler in the tobacco rod causes the extremity to expand and to thus remain in satisfactory frictional engagement with the mouthpiece.

Alternatively, and if the internal diameter of the prefabricated mouthpiece exceeds the diameter of the respective extremity, the end of the mouthpiece may be deformed radially inwardly and around the extremity so as to establish a permanent connection between the mouthpiece and the tobacco rod. If the mouthpiece consists of thermoplastic material and if, in the prefabricated state of the mouthpiece, its end has a diameter which at most equals the diameter of the corresponding extremity, the mouthpiece may be heated to deformation temperature of its material and is thereupon expanded, while its material is in deformable state, to such an extent that the internal diameter of its end exceeds the diameter of the extremity before the latter enters the mouthpiece. The mouthpiece is thereupon mechanically deformed by compressing its end radially inwardly while the material is still in deformable state. On subsequent cooling or chilling, the thus compressed and deformed end of the mouthpiece sets and adheres strongly to the tobacco rod.

If the thermoplastic material of the mouthpiece is of the type which has a tendency to expand in response to heating and contracts in response to cooling, a mouthpiece whose end has an internal diameter which is less than the diameter of the respective extremity may be heated to a temperature at which its end expands sufficiently to permit for convenient insertion of the extremity. In response to subsequent cooling, the mouthpiece contracts and adheres to the tobacco rod.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings, in which:

FIG. 1a is a side elevational view of an apparatus which embodies one form of my invention and which is arranged to apply to each consecutive tobacco rod two plastic mouthpieces at a time;

FIG. 1b is a top plan view of the apparatus, substantially as seen in the direction of arrows from the line II—II of FIG. 1;

FIG. 3 is a somewhat diagrammatic side elevational view of a modified apparatus;

FIG. 4 is a top plan view of one-half of the modified apparatus, substantially as seen in the direction of the arrow IV in FIG. 3;

FIG. 5 is an enlarged side elevational view of a molding unit which forms part of the apparatus shown in FIGS. 3 and 4;

FIG. 6 is a fragmentary end elevational view of the molding unit, substantially as seen in the direction of the arrow VI in FIG. 5;

FIG. 11 is an enlarged fragmentary axial section through a molding tool forming part of the molding unit which is shown in FIG. 5;

FIG. 12 is an enlarged side elevational view of a compressing jaw which forms part of the molding tool shown in FIG. 11;

FIG. 13 is an end elevational view of the molding tool, substantially as seen in the direction of the arrow XIII shown in FIG. 12;

FIG. 14 is a section substantially as seen in the direction of arrows from the line XIV—XIV of FIG. 12;

FIG. 15 (composed of FIGS. 15a and 15b) is an enlarged top plan view of the conveyors for mouthpieces and of the two transfer stations, substantially as seen in the direction of the arrow IV in FIG. 3;

FIG. 16 (composed of FIGS. 16a and 16b) is a vertical section, substantially as seen in the direction of arrows from the line XVI—XVI shown in FIGS. 15a and 15b;

FIG. 17 is a side elevational view, substantially as seen in the direction of the arrow XVII shown in FIG. 15b;

FIG. 18 is an enlarged fragmentary view of a detail of the structure shown in FIG. 15b; and FIG. 19 is a diagrammatic top plan view of a third apparatus.

Figure 2A:
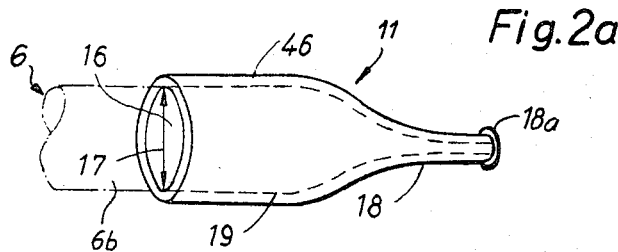
FIG. 2a is a perspective view of a mouthpiece which may be applied by the apparatus of FIGS. 1a and 1b, the mouthpiece being shown in its final form, i.e., subsequent to completed assembly with a tobacco rod a portion of which is indicated by phantom lines.

Referring first to FIGS. 1a and 1b, there is shown an apparatus for assembling mouthpieces 11L, 11R with tobacco rods 6 of double unit length. Each tobacco rod 6 comprises a solid cylindrical filler and a tubular wrapper which surrounds the filler, and these rods are assumed to contain cigar tobacco. The apparatus is constructed in such a way that each tobacco rod 6 is assembled with two mouthpieces 11L, 11R at a time, i.e., that each extremity 6b of the tobacco rod is inserted into a mouthpiece 11L or 11R. On completion of the assembling operation, the rods 6 are subdivided by a rotary disk-shaped cutter 26 which is located at the downstream end of a continuously driven conveyor so that each tobacco rod 6 yields two cigars of unit length. The plane 25 of the cutter 26 is normal to the axes of the tobacco rods 6 and is located midway between the extremities 6b of such rods. Each cigar of unit length carries a mouthpiece 11L or 11R.

The reference characters "L" and "R" respectively indicate the left-hand and the right-hand mouthpieces or the left-hand and right-hand components of the assembling apparatus. The tobacco rods 6 are advanced sideways (i.e., in a direction at right angles to their axes as indicated by an arrow 6a) and are transported continuously and at a constant speed by a conveyor including two endless chains 1L, 1R which are respectively trained around sprocket wheels 2L, 3L and 2R, 3R. The sprocket wheels 2L, 2R are driven by a central drive unit 20 through the intermediary of a suitable transmission which is indicated schematically by a phantom line 20a. This transmission drives a shaft 5 which is rigid with the sprocket wheels 2L, 2R.

The links of the chains 1L, 1R are provided with transversely aligned pockets or holders 1a which accommodate the tobacco rods 6 so that these rods are held at an equal distance from each other. The sprocket wheels 3L, 3R are mounted on an idler shaft 4.

The numeral 13 denotes a feed drum having axially parallel peripheral pockets 13a which supply tobacco rods 6 seriatim into the pockets 1a of the chains 1L, 1R. The drum 13 is driven in a counterclockwise direction, as viewed in FIG. 1, and its drive is synchronized with the transmission 20a so that each pair of aligned pockets 1a receives a tobacco rod. The pockets 13a receive tobacco rods 6 through a chute 14 shown in FIG. 1. Of course, the left-hand portion of the drum 13 is surrounded by suitable shields (not shown) which prevent the tobacco rods from falling out on their way toward the upper stringers of the chains 1L, 1R. Alternatively, the drum 13 may be a suction drum so that the tobacco rods 6 are retained therein by negative pressure. The transmission which drives the drum 13 derives motion from the drive unit 20 and is indicated in FIG. 2 by arrows 21. The unit 20 also drives a tobacco rod forming machine (not shown) which supplies the chute 14 with tobacco rods 6. The tobacco rod forming machine is of known design and its construction forms no part of the present invention.

The tobacco rods 6 which enter the pockets 1a of the chains 1L, 1R advance past two pasters 7L, 7R which accommodate suitable paste applicators capable of coating the respective extremities of the tobacco rods with a layer of adhesive paste. The pasters 7L, 7R apply layers of adhesive paste around the peripheral surfaces of the respective extremities 6b, such layers being provided mainly as a precautionary measure to insure absolutely reliable adherence of the mouthpieces 11L and 11R.

Each of the pasters 7L, 7R is followed by a mouthpiece applicator or conveyor 8L, 8R which serves to advance and to apply the mouthpieces 11L, 11R onto the respective extremities 6b of successive tobacco rods 6. In the illustrated embodiment, the mouthpiece conveyors resemble rotary wheels or drums which are driven by a transmission 20b in synchronism with the chains 1L, 1R and which support the respective mouthpieces in such a way that the open ends of the mouthpieces are more distant from the axes of the conveyors 8L, 8R. The path of the tobacco rods 6 is tangential to the path of the mouthpieces on the conveyors 8L, 8R. The periphery of each of the conveyors 8L, 8R carries sockets 10L, 10R which receive the nipples of the respective mouthpieces and hold them in requisite position during travel toward the actual transfer station 108L, 108R respectively. The exact construction of the sockets 10L, 10R will be described in connection with FIG. 18. The conveyors 8L, 8R respectively receive mouthpieces 11L, 11R from suitable sources of supply here shown as magazines. 9L, 9R. Each of the mouthpieces 11L, 11R resembles the prefabricated mouthpiece 11 which is illustrated in FIG. 2a. This mouthpiece consists of synthetic thermoplastic material and comprises a sleeve-like part 46 (hereinafter called end) which resembles a hollow cylinder. The diameter of the internal space 16 defined by the end 46 is indicated at 17. The other end of the mouthpiece 11 resembles a nipple 18 which is provided with a bead 18a. The internal diameter 17 of the cylindrical end 46 ultimately at most equals but is preferably somewhat smaller than the diameter of the adjoining still non-compressed or non-confined extremity 6b of the tobacco rod 6. The space 16 forms part of a channel 19 which conveys smoke into the smoker's mouth, i.e., via the nipple 18.

At the time the mouthpiece 11 is produced, the diameter 17 of the end 46 is at most equal to but is normally somewhat smaller than the diameter of the extremity 6b. Therefore, the end 46 must be expanded or widened to such an extent that its internal space 16 can readily accommodate the extremity 6b without subjecting the tobacco rod 6 to excessive axial or other deforming stresses. The apparatus of FIGS 1a and 1b comprises two expanders 12L, 12R which cooperate with the mouthpiece conveyors 8L, 8R and expand the ends 46 of the mouthpieces 11L, 11R before such mouthpieces reach the respective extremities of the tobacco rods 6. In the illustrated embodiment, the expanders 12L, 12R respectively comprise conical or furstoconical expanding tools 23L, 23R which are reciprocable in directions indicated by double-headed arrows and, while performing their working or forward strokes, penetrate into the respective mouthpieces to enlarge the internal diameters of their ends 46. In order to avoid destruction of mouthpieces during expansion by the tools 23L, 23R, the mouthpieces issuing from the magazines 9L, 9R and advancing with the conveyors 8L, 8R pass through suitable heating devices 22L, 22R which are located ahead of the expanders 12L, 12R and which heat the mouthpieces to such a temperature that the thermoplastic material is readily deformable. The phantom line 20c indicates a transmission which receives motion from the drive unit 20 and serves to operate the pasters 7L, 7R so that these pasters apply adhesive to the respective extremities 6b of consecutive tobacco rods 6 in synchronism with the operation of the conveyor including the chains 1L and 1R. The transmission 20d drives the expanding tools 23L, 23R in synchronism with rotary movement of the mouthpiece conveyors 8L, 8R so that each consecutive mouthpiece 11L, 11R is expanded sufficiently to readily receive one extremity of a tobacco rod.

The distance between the axes about which the conveyors 8L, 8R rotate is selected in such a way that the extremities 6b of the tobacco rods 6 are automatically introduced into the enlarged internal spaces 16 of the ends 46 of the mouthpieces 11L, 11R. The application of mouthpieces takes place gradually and is carried out while the axes of two simultaneously applied mouthpieces 11L, 11R coincide with the axis of the corresponding tobacco rod 6 therebetween. The sockets 10L, 10R permit for ready withdrawal of nipples 18 in directions radially outwardly with reference to the conveyors 8L, 8R so that, once applied to the corresponding tobacco rod, each mouthpiece is readily separated from its conveyor 8L or 8R. Since two mouthpieces 11L, 11R are invariably slipped on in a simultaneous step, the tobacco rod 6 therebetween is held against axial displacement because the axial stresses applied to one of its extremities by the mouthpiece 11L are fully balanced by axial stresses transmitted by the mouthpiece 11R. The axial stresses are minimal because the function of the tools 23L, 23R is to widen the ends 46 to such an extent that the application of mouthpieces takes place with a minimum of pressure.

As the tobacco rods 6 continue to advance beyond the two transversely aligned transfer stations 108L, 108R, they pass between two mirror symmetrical compressing or molding devices 24L, 24R which are driven by a further transmission 20e. These devices respectively comprise compressing or deforming or molding tools 15L, 15R which are reciprocable in directions indicated by double-headed arrows and in the direction of travel of the upper stringers of chains 1L, 1R and serve to subject the ends 46 of the aligned mouthpieces 11L, 11R to radially inwardly directed compressive stresses so as to move the internal surfaces of the ends 46 into full contact with the layers of adhesive applied by the pasters 7L, 7R. The tools 15L, 15R resemble circumferentially complete or slotted sleeves or caps which perform working strokes at a rate to make sure that each consecutive mouthpiece is properly molded before it reaches the cutting or subdividing station. These tools can compress or deform the respective mouthpieces to such an extent that the internal diameters 17 are reduced to their original length. The compressing units 24L, 24R may but need not be provided with heating means because the heating action of the devices 22L, 22R normally suffices to maintain the material of the mouthpieces in deformable state while the mouthpieces advance with the conveyors 8L, 8R, thereupon past the transfer stations 108L, 108R, and finally past the compressing devices 24L, 24R. The compressive action of the tools 15L, 15R invariably suffices to insure that the ends 46 snugly surround the respective extremities 6b of the tobacco rods 6, and the sealing and retaining action is enhanced by the adhesive which is applied by the pasters 7L, 7R.

The tobacco rods 6 thereupon advance past the subdividing station to be severed by the cutter 26 so that each rod yields two finished cigars of unit length. The vertical symmetry plane 25 of the cutter 26 extends midway between the component parts indicated by the characters L and R. Such component parts may but need not be truly mirror symmetrical with reference to the plane 25 since it is clear that the paster 7L need not be located directly opposite the paster 7R and/or that the magazines 9L, 9R or the expanders 12L, 12R could be positioned at a different angle without affecting the utility of the apparatus.

The operation of the apparatus shown in FIGS. 1a and 1b will be readily understood from the foregoing description. While it is possible to drive the chains 1L, 1R intermittently, continuous operation at a constant speed is preferred because the apparatus can assemble the mouthpieces with tobacco rods at the same rate at which the rods issue from a continuous cigar rod making machine. The cutter 26 is driven by a further transmission 20f.

If the tobacco rods 6 are of unit length, the units and devices marked "L" or "R" may be dispensed with. In such instances, the apparatus preferably comprises a backup device, for example, an endless belt which travels at the speed of the belts 1L, 1R and abuts with one of its stringers against one end face of each tobacco rod. The backup belt will prevent the rods of unit length from yielding axially when they pass along the pasting, mouthpiece transferring and molding stations. Also, such backup belt will insure that the tobacco rods of unit length reach the various stations in proper axial position for application of paste, for application of mouthpieces and for transmission of compressive stresses to mouthpieces. It can be said that the parts 7R, 8R, 15R or 7L, 8L, 15L constitute a backup device for the rods 6.

If the tobacco rods which are advanced by the conveyor belts 1L, 1R are of more than double unit length, the operation may be carried out as described in connection with FIGS. 1a and 1b, but each rod is ultimately subdivided into more than two sections. For example, let it be assumed that the apparatus of FIGS. 1a and 1b is used for connecting mouthpieces 11 with tobacco rods of quadruple unit length. The rods are advanced in a manner as shown in FIG. 1b and each extremity of each consecutive rod is assembled with a mouthpiece. The cutter 26 is replaced by two cutters which subdivide each tobacco rod of quadruple unit length into two end sections (actually finished cigars) of unit length and into a central section of double unit length. The central sections of double unit length are then advanced through an apparatus which is identical with the apparatus of FIGS. 1a and 1b so that each extremity of each section of double unit length receives a mouthpiece 11.

Figure 2B:
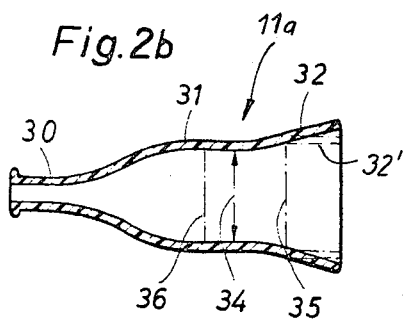
FIG. 2b is an axial section through a modified mouthpiece which is shown in expanded condition ready to receive one extremity of a tobacco rod.
Figure 2C:
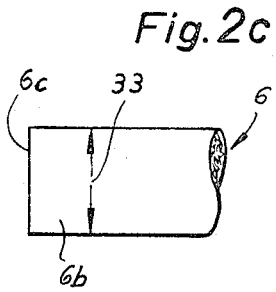
FIG. 2c is a fragmentary side elevational view of a tobacco rod which is ready to be inserted into the modified mouthpiece of FIG. 2b.

FIG. 2b illustrates a mouthpiece 11a in expanded condition, i.e., subsequent to travel past the expander 12L or 12R or an analogous expander. This mouthpiece comprises a nipple 30 and a sleeve-like end 31 having a conically outwardly diverging terminal portion 32. The inner portion of the end 31 has a constant diameter as indicated at 34. Of course, it is equally possible to manufacture the mouthpieces 11a in such a way that their ends are provided with conically diverging terminal portions 32. The mouthpiece 11a is arranged to accommodate the extremity 6b of the truly cylindrical tobacco rod 6 shown in FIG. 2c, this tobacco rod having a constant diameter 33 which exceeds slightly the internal diameter 34 shown in FIG. 2b. The end face 6c of the tobacco rod 6 may be introduced to the phantom-line 35 (i.e., only into the conical terminal portion 32) or to the phantom line 36 (i.e., to such an extent that the extremity 6b must undergo some radial compression). In the first instance, namely, when the end face 6c extends to the line 35, the extremity 6b is not subjected to any axial or radial stresses. On the other hand, and if the mouthpiece 11a is applied to such an extent that the end face 6c extends to the line 36, the tobacco rod is subjected to certain axial and radial stresses. Once the extremity 6b is properly received in the end 31, the latter is deformed so that its terminal portion 32 moves radially inwardly to the phantom-line position 32' whereby the end 31 forms an airtight seal around the extremity 6b and simultaneously adheres to the tobacco rod 6 with a force which is sufficient in normal handling of the tobacco rod. Such compression can be carried out by the tool 15L or 15R or by an analogous device.

Figures 2D, 2E:
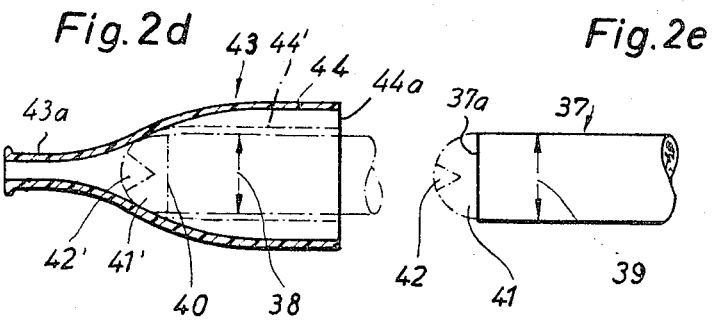
FIG. 2d is an axial section through a third mouthpiece which is shown in expanded condition.
FIG. 2e is a fragmentary side elevational view of a tobacco rod which is about to be inserted into the mouthpiece of FIG. 2d.

FIG. 2d illustrates in solid lines a somewhat modified plastic mouthpiece 43 which is shown in expanded condition. The internal diameter of the sleeve-like end 44 is constant all the way to the end face 44a and exceeds considerably the diameter 39 of a cylindrical tobacco rod 37 which is shown in FIG. 2e. When the end 44 is deformed or compressed radially inwardly, it moves to the phantom-line position 44' and its internal diameter 38 is then somewhat smaller than the diameter 39 of the tobacco rod 37. This means that the extremity 37b of the rod 37 is properly retained and sealed by the internal surface of the deformed end 44. The end face 37c of the properly inserted extremity 37b extends to the phantom line 40 shown in FIG. 2d so that the end 44 may surround a certain length of the tobacco rod 37, namely, such a length which may exceed the length of the diameter 39. The nipple 43a of the mouthpiece 43 need not be deformed at all. FIG. 2d shows further that the peripheral surface of the end 44 (in the deformed condition 44') extends slightly beyond the peripheral surface of that portion of the tobacco rod 37 which is not received in the mouthpiece 43, i.e., that the external diameter of the end 44 (in the position 44') exceeds the diameter 39 of the exposed portion of the tobacco rod 37 by almost twice the wall thickness of the end 44.

Many cigars or cigarillos are provided with extremities having rounded or semispherical tips 41 as shown in FIG. 2e by a phantom line. In order to allow for satisfactory flow of smoke, the tip 41 is normally formed with a wedge-like cutout 42. When the tip 41 extends into the mouthpiece 43, it assumes the position 41' shown in FIG. 2d and it will be noted that the width of the cutout 42 (in the position 42') need not be reduced at all or is reduced only negligibly when the sleeve 44 is compressed radially inwardly to move to the position 44'. In other words, the mouthpiece 43 may be deformed without appreciably or adversely affecting the flow of smoke into the nipple 43a.

Figure 2F:
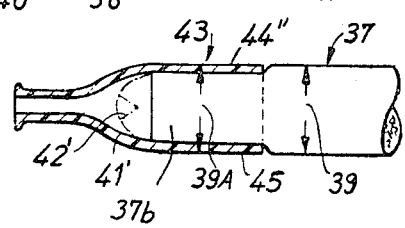
FIG. 2f is a fragmentary side elevational view of a finished smokers' article with the mouthpiece shown in axial section and deformed to such an extent that the peripheral surface of its cylindrical end is flush with the exposed peripheral surface of the tobacco rod.

Referring to FIG. 2f, it will be seen that the sleeve-like end 44 of the mouthpiece 43 may be compressed to such an extent that it moves to the position 44" in which its external diameter 39A equals the diameter 39 of the unconcealed portion of the tobacco rod 37. In other words, the peripheral surface 45 of the end 44" is flush with the peripheral surface of the visible part of a cylindrical tobacco rod. The extremity 37b undergoes somewhat greater compression (as indicated at 37b"), but the deformation of the tip 41 and cutout 42 is negligible (therefore, FIG. 2f uses the same numerals 41', 42' as used in FIG. 2d).

A very important advantage of smokers' articles wherein the tobacco rods are assembled with mouthpiece in a manner as shown in FIG. 2f is that the mouthpiece need not extend beyond the outlines of the tobacco rod. Therefore, the articles may be stacked in boxes in the same way as cigarettes or cigars without mouthpieces, i.e., there is no need to insert into such boxes panels, sheets or other distancing elements which are often used in connection with cigars whose diameter is not constant from end to end. Such distancing elements prevent undue wobbling of and eventual damage to boxed articles during shipment or in a retail store. It is to be noted again that the mouthpieces of the type shown in FIG. 2f may be used with advantage not only on cigars but also on cigarillos, cheroots and/or cigarettes.

Each of the mouthpieces shown in FIGS. 2a to 2f may be applied by resorting to an apparatus which is similar to the apparatus of FIGS. 1a and 1b. If the mouthpieces are manufactured in such a way that their ends can receive the extremities of tobacco rods without necessitating expansion, the expanders 12L, 12R are arrested or are detached from the apparatus. This will be described in connection with FIGS. 3–18 which show an apparatus wherein the mouthpieces need not be compressed at all. The apparatus of FIGS. 1a and 1b is preferably furnished with two or more sets of expanders or with adjustable expanders so that they may expand mouthpieces to a desired size, depending on the transverse dimensions and configuration of tobacco rods which are supplied by the drum 13 or by another type of feed.

The apparatus of FIGS. 1a and 1b may be modified still further by omitting the compressing devices 24L, 24R. This is possible if the plastic material of the mouthpieces 11L, 11R is such that they can undergo temporary expansion but automatically reassume their original shape in response to cooling. Non-toxic thermoplastic materials which contract on forced or automatic cooling are well known in the art and may be used in the manufacture of mouthpieces as long as their contraction is sufficiently predictable to insure satisfactory engagement with the respective extremities of the tobacco rods. It is clear, however, that the deforming stresses which resulted in temporary expansion of thermoplastic material must be terminated prior to cooling because the material will not contract or will contract very little if the mouthpiece is allowed or caused to cool while its material is forcibly held against contraction. In other words, once the heated and expanded mouthpieces are applied to the extremities 6b of the tobacco rods 6, they must be free to contract (solely against the resistance offered by the extremities 6b) so that such contraction in response to cooling can actually take place. The material must remain sufficiently heated during application of mouthpieces to the extremities 6b but is then allowed to contract in a fully automatic way in response to cooling so that the end of the mouthpiece may sealingly surround and adhere to the respective tobacco rod. In such apparatus, the expanders 12L, 12R are preferably located in immediate proximity to the transfer stations 108L, 108R to make sure that automatic contraction will not take place prior to actual application of mouthpieces to the respective extremities 6b. If it consists of an automatically contractible thermoplastic material, such as polystyrene, polyvinyl chloride or a polyolefin (e.g., polyethylene or polypropylene), the mouthpiece is preferably dimensioned in such a way that the external diameter of its sleeve-like end at least approximates the diameter of a non-deformed portion of the corresponding tobacco rod (see FIG. 2f). Of course, the dimensions of the mouthpieces will depend on the purpose of tobacco rods, i.e., whether such rods are used in the manufacture of cigars, cigarillos, cheroots or cigarettes. Polyolefins are preferred when the mouthpieces are to be shrunk onto the tobacco rods without resorting to mechanical compressing tools, i.e., solely in response to cooling.

Referring again to FIG. 1b, the numerals 27L, 27R denote two additional pasters which may be utilized to apply adhesive to the internal surfaces of the mouthpieces 11L and 11R. The pasters 27L, 27R comprise injection nozzles 27a which discharge sprays of liquid adhesive at intervals determined by the rotational speed of the mouthpiece conveyors 8L, 8R. A transmission 20g receives motion from the central drive unit 20 and operates the pasters 27L, 27R at requisite intervals. As shown, these pasters are located downstream of the expanders 12L, 12R so that the tools 23L, 23R are not contaminated with adhesive. As a rule, one set of pasters 7L, 7R or 27L, 27R will suffice to insure satisfactory adherence of mouthpieces to the tobacco rods; therefore, the pasters 27L, 27R were shown by phantom lines to indicate that they are not absolutely necessary. In fact, and as mentioned hereinbefore, all of the pasters may be omitted because the remaining parts of the apparatus can be arranged to provide a satisfactory connection between each mouthpiece and the respective tobacco rod. This will be readily understood by referring to FIG. 2a, 2b, 2d or 2f each of which shows that a portion of the channel in the respective mouthpiece tapers in a direction toward the nipple. Thus, and if the extremity 6b or 37b of a cigar rod 6 or 37 is introduced into the corresponding mouthpiece to such an extent that a portion of the extremiy is forced to penetrate into the tapering portion of he channel, the friction generated between the tobacco rod and the mouthpiece will suffice to insure satisfactory retention without resorting to adhesive. In other words, even if a tobacco rod has the same diameter from end to end, its extremities may be properly connected with mouthpieces without resorting to pasters. The extent of penetration of such extremities into the mouthpieces depends on the positioning of the conveyors 1L, 1R and 8L, 8R with reference to each other. The same holds true for tobacco rods which are provided with rounded tips 41 as shown in FIGS. 2d, 2e and 2f. Thus, if the tip 41 is forced well into the channel of the mouthpiece 43, its external surface will be held in requisite frictional engagement with the internal surface of the mouthpiece.

The apparatus of FIGS. 3 to 18 differentiates from the apparatus of FIGS. 1a and 1b in that it is used for assembling of tobacco rods with mouthpieces of the type wherein the internal diameter of the cylindrical or sleeve-like end of each prefabricated mouthpiece is less than the diameter of the extremity of a prefabricated tobacco rod. In order to insure that such extremity can be readily inserted into the ends of the corresponding mouthpieces without risking excessive deformation or destruction of the tobacco rod, the apparatus is provided with a molding unit which temporarily deforms the extremities of tobacco rods in such a way and to such an extent that the rods can be readily inserted into the mouthpieces. The deformation or compression of such extremities is of temporary nature and disappears upon completion of the assembling step, i.e., the extremities are allowed to expand due to innate resiliency of their fillers, and the thus expanded extremities remain in strong frictional engagement with the mouthpieces. The connections between the tobacco rods and the mouthpieces may be improved by utilizing pasters for the extremities of tobacco rods and/or for the open ends of the mouthpieces.

As shown in FIG. 3, the modified apparatus comprises a rotary feed drum or conveyor 101 which supplies tobacco rods 111 seriatim and sideways. This feed drum receives tobacco rods from a source of supply 100 which may form part of a continuous cigar rod making machine of known design. The pockets or holders of the feed drum 101 deliver tobacco rods seriatim to the pockets of an intermediate conveyor or drum 102 which forms part of the aforementioned molding unit and conveys properly shaped tobacco rods into the pockets in the upper stringers of two endless chains 103R, 103L (see also FIG. 4) corresponding to the chains 1L, 1R of FIGS. 1a and 1b and forming part of a conveyor for tobacco rods. The chains 103L, 103R and the drums 101, 102 are driven continuously by a drive unit which will be described in connection with FIG. 7. The mouthpieces 333L, 333R are applied while the tobacco rods 111 travel with the chains 103L, 103R, and such tobacco rods are then halved by a rotary disk-shaped cutting device 108. The resulting cigars 114 of unit length (see FIG. 4) are then transferred onto a transporting belt 104 which delivers them to storage or to a packing machine, not shown. The peripheral speed of the drums 101, 102 corresponds to the speed of the chains 103L, 103R and, if desired, to the speed of the transporting belt 104. In FIG. 3 or 4, the tobacco rods 111 travel in a direction from the left to the right. FIG. 4 shows that the source 100 includes a chute 100a in which tobacco rods 111 of double unit length travel lengthwise, i.e., axially, and the feed drum 101 is provided with suitable stops which arrest the tobacco rods in requisite position so that the rods which are accommodated in the pockets of the feed drum 101 form a single file and travel sideways toward the point of transfer into the pockets of the intermediate drum 102. The molding heads of the molding unit which includes the intermediate drum 102 will be described in connection with FIGS. 11 to 14. These molding heads serve to compress the extremities of the rods 111 and the thus deformed extremities are then coated with adhesive while advancing past a pair of pasters 106L, 106R which are adjacent to the chains 103L, 103R. At the transfer stations 99L, 99R (see FIG. 15b), the rods 111 are assembled with pairs of mouthpieces 333L, 333R to form therewith assemblies 113 which are best shown in the upper part of FIG. 18. The numerals 112 denote in FIG. 18 such rods 111 whose extremities were treated by the heads of the molding unit.

The transfer stations 99L, 99R are located in zones where the conveyor including the chains 103L, 103R advances between a pair of conveyors or mouthpiece applicators 107L, 107R which respectively serve to furnish the mouthpieces 333L, 333R. The conveyors 107L, 107R respectively receive mouthpieces from two magazines 109L, 109R. The phantom line 110 indicates in FIG. 4 a vertical symmetry plane which extends midway between the extremities of the tobacco rods 111 and accommodates the cutting edge of the cutting device 108. The conveyors 103L–103R, 101, 102, the pasters 106L, 106R, the magazines 109L, 109R and the transporting belt 104 are mounted on a frame or base 115 which is provided with pairs of bearing brackets 116L–116R, 117L–117R, 118L–118R and 119L–119R. As in FIGS. 1a and 1b, the capital letters "L" and "R" shown in FIGS. 3 to 18 respectively indicate the left-hand and right-hand components of the same type and, in most instances, such components are mirror symmetrical with reference to the plane 110.

As shown in FIGS. 5 and 6, the feed drum 101 is mounted on a transversely extending horizontal shaft 131 which is journalled in the bearing brackets 116L, 116R. The shaft 131 carries a sprocket wheel 120 which is coupled with a second sprocket wheel 121 by a chain, not shown. The sprocket wheel 121 is mounted on a stub shaft 122, together with a sprocket wheel 123 and a pulley 124. The sprocket wheel 123 is driven by a second chain, not shown, to rotate the shafts 122 and 131. The pulley 124 drives a belt 125 which in turn drives a second pulley 126 mounted on a shaft 127. The stub shaft 122 is mounted in the bracket 116L and the shaft 127 is mounted in the brackets 116L, 116R. The shaft 127 supports the rotary parts of the molding unit including the drum 102. The arrows shown in FIG. 5 indicate that the drums 101, 102 are driven in opposite directions. The sprocket wheel 123 which receives motion from the main drive unit of the apparatus rotates the drums 101, 102 at a constant speed and the speed of axially parallel pockets or holders on the peripheries of the drums 101, 102 is the same. The drum 101 comprises two axially spaced disks 130L, 130R (see FIG. 6) which are provided with axially parallel pockets for the tobacco rods 111. The drum 102 also comprises two axially spaced disks which are provided with aligned pockets for reception of tobacco rods 111 whereby such rods undergo deformation and are discharged from the drum 102 as rods 112. It will be seen that each pocket or holder of the drum 101 or 102 consists of two spaced axially aligned pockets. The shields which surround portions of the drum 101 to prevent uncontrolled ejection of tobacco rods 111 by centrifugal force or in response to gravity were omitted for the sake of clarity. Such shields may be replaced by suction ducts machined into the pockets of the disks 130L, 130R to retain the tobacco rods by producing a pressure differential in a manner well known from the art of tobacco processing machines, particularly from the art of filter cigarette machines wherein sections of cigarette rods are assembled with plugs of filter material.

The drum 102 rotates with two tool holders 132L, 132R, which are mounted on the shaft 127. Each of these tool holders supports a set of axially reciprocable tools 133L, 133R which are aligned with the pockets of the respective disk and comprise molding heads 134L, 134R. Each head 134L, 134R faces the adjoining extremity of the tobacco rod 111 which is located between a pair of aligned tools 133L, 133R. The tools 133L, 133R are biased by suitable helical springs (see the spring 153R in FIG. 11) which tend to shift the corresponding heads 134L, 134R axially of and away from the adjoining extremities of the tobacco rods 111. The outer end of each tool carries a roller follower 135L or 135R which tracks the face of a fixed cam 136L or 136R. These cams control axial movements of the corresponding sets of tools in such a way that the heads 134L, 134R move toward and engage the respective extremities of the tobacco rods 111 as soon as the rods enter the pockets of the drum 102. During axial movement toward the adjoining extremities, the jaws of the respective molding heads move apart. The jaws close shortly when the respective tools move axially and away from the adjoining extremities and, in response to further withdrawal of the tools, the jaws open again to be ultimately withdrawn to their starting positions. The arrangement is such that the heads 134L, 134R release the tobacco rods 111 (in deformed condition as indicated at 112) only at the time when the rods are free to drop into the pockets of the chains 103L, 103R. In other words, the drum 102 need not be provided with shields and/or suction ducts because the heads 134L, 134R are capable of properly supporting the tobacco rods 111 all the way from the point of transfer between the drums 101, 102 to the point of transfer between the drum 102 and the chains 103L, 103R.

During closing of the jaws on the heads 134L, 134R, the respective extremities are compressed radially inwardly from all sides and the extent of such compression is selected with a view to insure that the deformed extremities can enter the ends of the respective mouthpieces 333L or 333R without causing excessive deformation of the tobacco rods 112. In other words, a deformed extremity can readily enter the internal space 16 of the mouthpiece end 46 shown in FIG. 2a. However, the deformation of each extremity is such that it will disappear with time, i.e., after the extremity enters the respective mouthpiece, whereby the thus expanded extremity adheres to the mouthpiece and insures that the latter remains attached to the tobacco rod. At least the major part of such deformation can disappear not later than at the time when the finished cigars 114 reach the transporting belt 104. In other words, the extremities of the tobacco rods 112 which reach the chains 103L, 103R are still deformed to such an extent that they can be readily introduced into the open ends of the mouthpieces 333L or 333R, but the deformation can disappear, either entirely or almost entirely, before the tobacco rods 112 reach the end of the path defined by the upper stringers of these chains.

FIGS. 11 to 14 illustrate in detail the construction of a molding tool 133R. This tool comprises a hollow spindle 150R which is reciprocable in the tool holder 132R. The bore of the spindle 150R receives an axially reciprocable control rod 151R whose outer end is attached to the housing 152R for the roller follower 135R. The housing 152R also serves as a stop for one end convolution of the spring 153R. The other end convolution of the spring 153R bears against the tool holder 132R so that this spring invariably maintains the follower 135R in contact with the face of the fixed cam 136R. The molding head 134R is bolted or screwed to the inner end of the spindle 150R and carries three articulately mounted jaws 160R, 161R, 162R which, when moved radially inwardly toward the axis of the control rod 151R, define a substantially complete mold cavity 163R of conical or semicylindrical shape. The dimensions of the mold cavity 163R (in closed position of the head 134R) are selected in such a way that the jaws 160R–162R bring about the aforementioned temporary deformation of one extremity of a tobacco rod 111.

The jaws 160R–162R are rockable in radial planes of the head 134R and are mounted on pivot pins 170R, 171R, 172R best shown in FIGS. 13 and 14. Each jaw resembles a two-armed lever one arm of which is biased by a circumferentially complete annular spring 130R' which tends to move the other arms away from each other, i.e., to open the jaws and to keep them away from the adjoining extremity of the tobacco rod 111. The inner end portion of the control rod 151R carries a control cam 175R which is slidable along suitable cam faces 128R machined into the jaws 160R–162R. For better understanding of the operation of the molding head 134R, FIG. 11 illustrates the control cam 175R in two axial positions. In the upper part of FIG. 11, the cam 175R is shown in its inner end position when the jaw 160R is rocked away from the tobacco rod 111. In the lower part of FIG. 11, the cam 175R is shown in a partially retracted intermediate position when the jaw 161R engages and deforms the adjoining extremity of the tobacco rod 111. In response to further retraction of the cam 175R, the spring 130R' is again free to contract and to move the jaws 160R–162R away from the tobacco rod.

When the follower roller 135R tracks a lobe on the fixed cam 136R (as actually shown in FIG. 11), the control rod 151R is shifted in a direction to the left and allows the spring 130R' to open the jaws 160R–162R. This takes place when the corresponding pocket of the drum 102 is ready to receive a fresh tobacco rod 111 from the feed drum 101. When the follower 135R thereupon travels along a sloping face of the cam lobe and allows the spring 153R to expand, the control cam 175R moves in a direction to the right and ultimately reaches the intermediate position shown in the lower part of FIG. 11. In such intermediate position, the cam 175R maintains the jaws 160R–162R in closed or operative positions whereby the jaws deform the extremity of the tobacco rod 111. The jaws remain in closed positions while the follower tracks a section 129R on the face of the fixed cam 136R. The length of the section 129R is selected in such a way that the extent of temporary deformation of the extremity on the tobacco rod 111 suffices to allow for convenient insertion into a mouthpiece 333R but also with a view to prevent permanent or long-lasting deformation. The face of the cam 136R then allows the follower 135R to move further in a direction to the right, as viewed in FIG. 11, and to entrain the control cam 175R whereby the spring 130R' contracts and disengages the jaws 160R–162R from the tobacco rod 111 (in the condition 112). The control cam 175R then shifts the spindle 150R with reference to the tool holder 132R so that the head 134R is moved axially of and away from the freshly deformed extremity of the tobacco rod 112. In such axial position of the head 134R, the tobacco rod 112 is free to descend into the aligned pockets of the chains 103L, 103R. The cam 136R thereupon shifts the control rod 151R with reference to the spindle 150R so that the control cam 175R slides along the full length of the cam faces 128R and returns to the axial position shown in the upper part of FIG. 11 to abut against suitable stop faces 160a on the jaws 160R–162R. On further leftward movement of the rod 151R, the spindle 150R also moves in the same direction and returns to the axial position of FIG. 11. Such axial movement of the spindle 150R and of the head 134R takes place immediately after the corresponding pocket of the drum 102 receives a fresh tobacco rod 111 so that the jaws 160R–162R are automatically moved to requisite positions with reference to one extremity of the fresh tobacco rod. The procedure is then repeated in the just described sequence. The operation of the remaining molding tools 133R and of the molding tools 133L is analogous. As stated before, the configuration of the faces on the cams 136L, 136R is such that the molding heads 134L, 134R actually carry the tobacco rods 111 all the way from the point of transfer between the drums 101, 102 to the point of delivery into the pocket of the chains 103L, 103R.

The frame 115 carries two arcuate guide rails 180L, 180R which are disposed at a level above the chains 103L, 103R. The guide rails extend along the two pasting stations and are located directly downstream of the point where the drum 102 delivers tobacco rods 112 into the pockets of the chains 103L, 103R.

Figure 10:
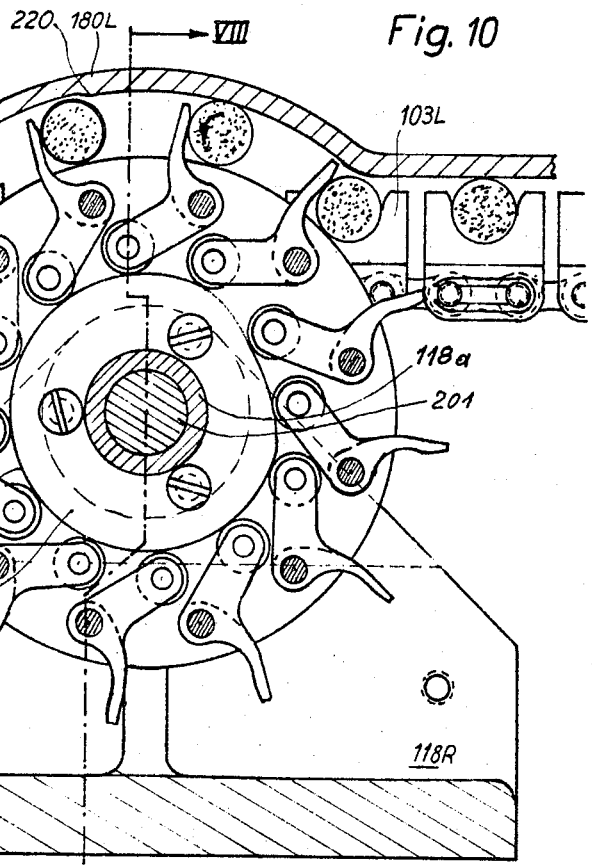
FIG. 10 is an enlarged vertical section, substantially as seen in the direction of arrows from the line X—X of FIG. 8.
Figures 8, 9:
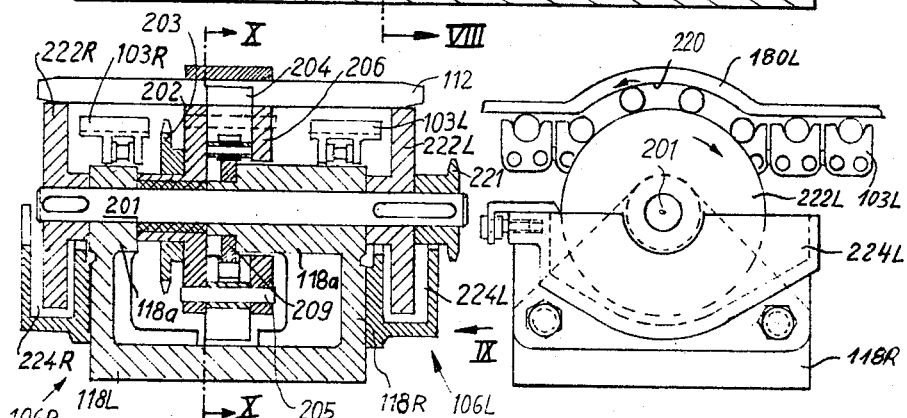
FIG. 8 is a transverse vertical section as seen in the direction of arrows from the line VIII—VIII of FIG. 5 or 10 and illustrates a paster for the extremities of tobacco rods.
FIG. 9 is a side elevational view of the paster, substantially as seen in the direction of the arrow IX in FIG. 8.

The two pasters 106L, 106R are illustrated in FIGS. 8 to 10. The frame 115 carries the aforementioned bearing brackets 118L, 118R which are provided with bearing sleeves 118a for a transversely extending horizontal shaft 201. The shaft 201 carries a transporting disk 202 which is rotatable with respect thereto and is connected to a sprocket wheel 203 which is rotated by the main drive unit of the apparatus to drive the disk 202. The latter carries a set of equidistant motion transmitting arms 204 which are rockable on pivot pins 205, each of these pins being parallel with the shaft 201. One end of each pivot pin 205 is mounted in a bearing ring 206 which participates in rotary movement of the transporting disk 202. Each arm 204 comprises a lug which extends beyond the periphery of the disk 202 and comes into actual engagement with the tobacco rods 112. These arms are further provided with roller followers 207 which track the face 208 of a fixed cam 209 secured to one of the bearing brackets 118L, 118R. The arms 204 are biased by springs (not shown) which maintain the followers 207 in contact with the cam face 208. The configuration of the cam face 208 is such that, while orbiting about the axis of the shaft 201, the lugs of the arms 204 for a while trail the periphery of the transporting disk 202 and thereupon move faster than the periphery of the disk. The drive for the disk 202 is synchronized with the drive for the chains 103L, 103R and drum 102 in such a way that a lug on one of the arms 204 moves underneath and lifts a freshly discharged tobacco rod 112 off the chains 103L, 103R. Upon completed application of adhesive, the rods 112 are redeposited into the pockets of the chains 103L, 103R. The periphery of the transporting disk 202 defines with the guide rails 180L, 180R an elongated channel 220 whose width (i.e., height as viewed in FIG. 10) equals the normal diameter of a tobacco rod 112. Consequently, the tobacco rods are compelled to roll along the periphery of the disk 202 (i.e., to rotate about their own axes) to make sure that each of their (deformed) extremities is coated with adhesive. The length of the channel 220 is selected in such a way that each tobacco rod 112 completes a little more than one full revolution, and this insures that both extremities of each rod 112 are properly coated with adhesive.

The shaft 201 is driven by a sprocket wheel 221 and carries two disk-shaped adhesive applicators 222L, 222R which rotates with the sprocket wheel 221. Portions of the applicators 222L, 222R dip into stationary paste pots 224L, 224R which are mounted on the bracets 118L, 118R and are connected with a suitable source of adhesive material so that the level of paste in each pot remains constant or nearly constant. The films of adhesive paste which adhere to the peripheries of the applicators 222L, 222R are applied to the respective extremities of the tobacco rods 112. As stated before, the channel 220 is of such length and width that each tobacco rod is compelled to complete a little more than a full revolution but not less than a full revolution whereby the two extremities are propery coated with adhesive and are thereupon redeposited in the pockets of the chains 103L, 103R. These chains then advance the tobacco rods 112 toward the transfer stations 99L, 99R where the rods are assembled with mouthpieces 333L, 333R in a manner as best shown in FIGS. 15a, 15b, 16a, 16b, 17 and 18.

It will be noted that the pasters 106L, 106R have a common drive and that a single set of motion transmitting arms 204 suffices to advance the tobacco rods 112 along these pasters. In fact, the two applicators 222L, 222R could dip into a common pot and the two guide rails 180L, 180R could be replaced by a single guide rail.

The construction of the conveyors 107L, 107R for the mouthpieces 333L, 333R is illustrated in FIGS. 15 and 16. For the sake of simplicity, FIGS. 15a–15b and 16a–16b will be referred to as FIGS. 15 and 16, respectively. The frame 115 supports a transversely extending horizontal drive shaft 301 which is driven by a sprocket wheel 302. The drive shaft 301 carries two bevel gears 303L, 303R which respectively mesh with bevel gears 304L, 304R secured to vertical shafts 305L, 305R. The shafts 305L, 306R are rotatable in bearing brackets 306L, 306R and carry turntables or rotors 307L, 307R. These rotors respectively carry annularly arranged sets of vertical pivot shafts 308L, 308R which are provided with levers 309L, 309R supporting roller followers 310L, 310R. The levers 309L, 309R are disposed at a level below the rotors 307L, 307R and their followers 310L, 310R respectively track the faces 311L, 311R of two disk cams 312L, 312R which are fixed to the brackets 306L, 306R. The levers 309L, 309R are biased by suitable springs (see the springs 320R in FIG. 18) which maintain the followers 310L, 310R in contact with the cam faces 311L, 311R.

The upper end portions of the pivot shafts 308L, 308R are rigidly connected with holders or sockets 330L, 330R for the mouthpieces 333L, 333R. Each socket has an open upper side and an open outer side, this outer side being the side which faces away from the shaft 305L or 305R. All other sides of the sockets 330L, 330R may be closed. The cams 312L, 312R cause the sockets 330L, 330R to swivel about the axes of the pivot shafts 308L, 308R when the rotors 307L, 307R rotate about the axes of the shafts 305L, 305R. This is best shown in FIG. 18.

Figure 7:
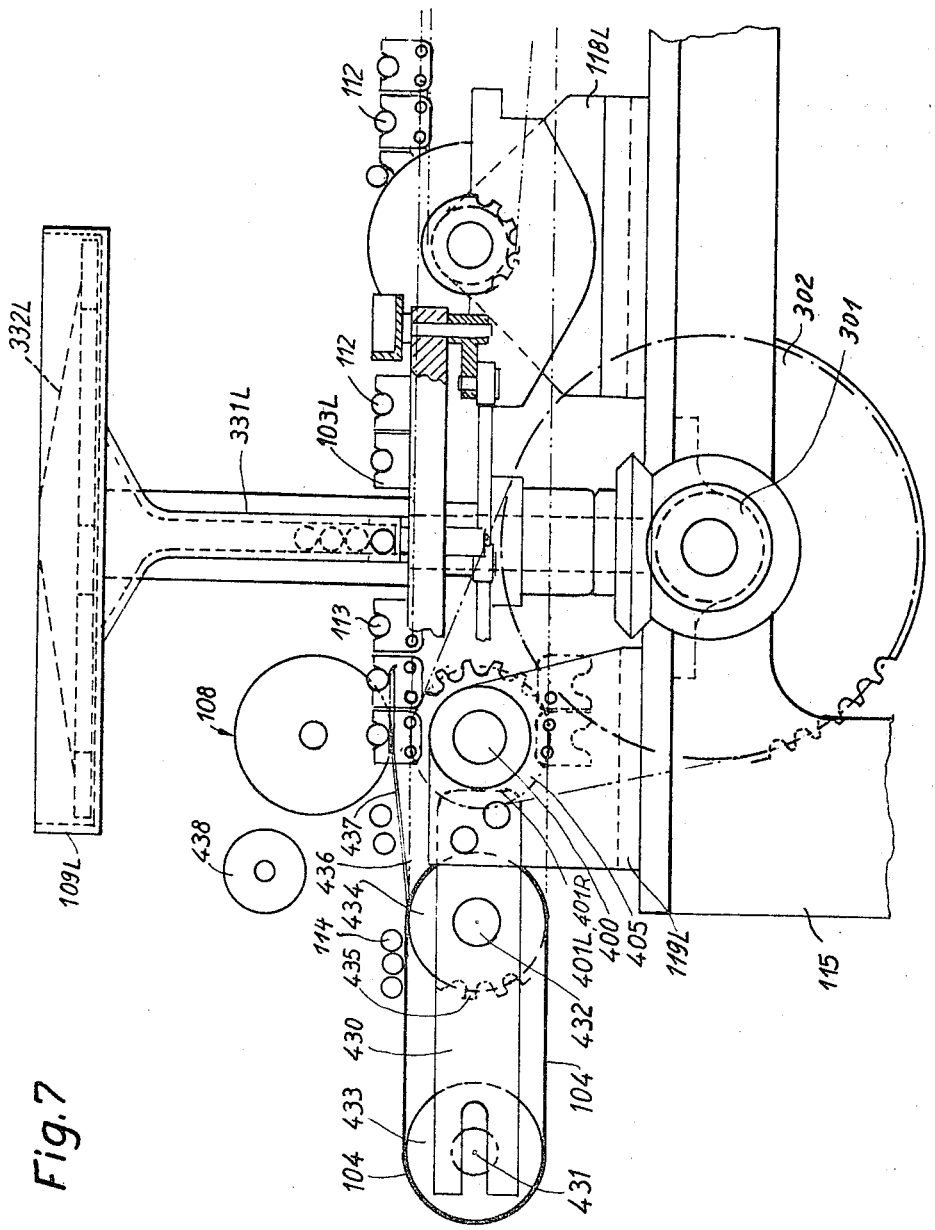
FIG. 7 is an enlarged side elevational view of a transfer station in the modified apparatus, substantially as seen in the direction of the arrow VII in FIG. 4.

The lowermost socket 330R shown in FIG. 18 extends radially with reference to the rotor 307 and is located below the discharge end of a vertical feed chute 331R for mouthpieces 333R. A similar feed chute 331L is provided to supply mouthpieces 333L into the holders 330L of the rotor 307L, see FIG. 16. The chutes 331L, 331R respectively receive mouthpieces 333L, 333R from the magazines 109L, 109R (see also FIGS. 3 and 4) which are located at a level above the rotors 307L, 307R, i.e., above the transfer stations 99L, 99R. FIGS. 3, 4 and 7 show that the magazines 109L, 109R are provided with suitable agitating devices 332L, 332R which are capable of feeding mouthpieces 333L, 333R into the chutes 331L, 331R, always in such a way that the nipples of the mouthpieces face the shafts 305L, 305R. The chutes 331L, 331R are stationary and their discharge ends admit mouthpieces into consecutive sockets 330L, 330R. As mentioned hereinbefore, the upper sides of the sockets are open so that they may receive mouthpieces by gravity feed. A mouthpiece 333R is shown in the lower part of FIG. 18 in a position it assumes immediately after entering the corresponding socket 330R, and it will be seen that the nipple faces the shaft 305R. The agitating devices 332L, 332R may be of the type as employed in bottle capping machines to feed properly oriented caps into chutes discharging into capping heads.

Even before the mouthpiece 333R shown in the lower part of FIG. 18 reaches the transfer station 99R, its socket 330R is turned by the face 311R of the cam 312R in such a way that the axis of the mouthpiece is parallel or nearly parallel to the axis of the corresponding tobacco rod 112. This is clearly shown in the upper part of FIG. 18. The conveyor 107R then causes the thus positioned mouthpiece to move sideways and to approach the adjoining extremity of the aligned tobacco rod 112 so that the open end of the mouthpiece automatically receives such extremity. It is to be noted that, at the time a tobacco rod 112 reaches the station 99R of FIG. 18, its ends are already provided with adhesive which was applied by the pasters 106L, 106R so that, even though its extremities are still deformed by the action of molding heads 134L, 134R, the film of adhesive will keep the mouthpieces in position while the ends of the fillers continue to expand.

Since the conveyors 107L, 107R are mirror symmetrical with reference to the plane 110, the rotor 307L feeds the mouthpieces 333L in the same way as the rotor 307R of FIG. 18. In other words, the rods 112 cannot be shifted axially because any stresses transmitted thereto by the mouthpieces 333L are invariably opposed by identical stresses transmitted by the mouthpieces 333R. The ratio of transmissions which drive the shafts 305L, 305R is the same so that the rotors 307L, 307R are driven at the same speed. The positioning of the cams 312L, 312R is mirror symmetrical so that each socket 330L which approaches the station 99L is accurately aligned with a socket 330R which approaches the station 99R. In other words, each tobacco rod 112 which travels between the nearest sockets 330L, 330R is invariably subjected to identical but oppositely directed axial stresses and retains its axial position.

When they approach the stations 99L, 99R, the sockets 330L, 330R are moved nearest to each other (see the upper part of FIG. 18) and are at least nearly parallel to the tobacco rods 112. The sockets then remain for a while in such parallelism while they move away from the stations 99L, 99R to make sure that they can be readily separated from the mouthpieces 333L, 333R. Such separation will take place automatically because some friction between the mouthpieces and the extremities of the tobacco rods is desirable and also because at least the tobacco rods are coated with adhesive. Before a socket 330L or 330R completes an arc of 180 degrees (while moving away from the station 99L or 99R), it again extends radially with reference to the rotor 307L or 307R so that it can receive a fresh mouthpiece from the chute 331L or 331R. It is to be recalled that the outer sides of the sockets 330L, 330R are open so that the mouthpieces can be withdrawn from such sockets with a minimum of friction.

The rotors 307L, 307R are driven at a constant speed and in synchronism with the chains 103L, 103R so that, while travelling toward and away from the transfer stations 99L, 99R, the sockets 330L, 330R are parallel with and move at the same speed as the tobacco rods 112 by simultaneously moving toward or away from the adjoining tobacco rod extremities. The spacing between the sockets 330L, 330R on the rotors 307L, 307R is selected in such a way that the sockets can be advanced and pivoted in the above outlined manner. In other words, while there exists a definite relationship between the spacing of pockets or holders on the chain 103L or 103R and the spacing between the sockets 330L or 330R, the spacing between the sockets need not be the same as the spacing between the pockets. It is further clear that the chains 103L, 103R may be replaced by a drum or by another suitable conveyor.

FIGS. 4, 15 and 17 further illustrate two additional pasters 340L, 340R which serve to apply films or layers of adhesive to internal surfaces of mouthpieces 333L, 333R before such mouthpieces reach the stations 99L, 99R. The pasters 340L, 340R respectively comprise injection nozzles 341L, 341R which are operated intermittently in synchronism with the conveyors 107L, 107R to insure that the interior of the open end of each consecutive mouthpiece is properly coated with adhesive. Reference may be had to the transmission 20g of FIG. 1a which connects the main drive unit 20 with the pasters 27L, 27R, these last mentioned pasters being analogous to the pasters 340L, 340R. The nozzles 341L, 341R are directed radially toward the axes of the vertical shafts 305L, 305R and can inject sprays of liquid adhesive through the open outer sides of the sockets 330L, 330R. FIG. 15 illustrates two sockets in accurate registry with the nozzles 341L, 341R so that the corresponding mouthpieces are in optimum positions to receive jets or sprays of adhesive.

The provision of rockable or pivotable sockets 330L, 330R is of particular advantage when the diameters of extremities on the tobacco rods 112 closely approximate the internal diameters of the mouthpieces 333L, 333R. It is then necessary to insure that the mouthpieces are in accurate axial alignment with the corresponding tobacco rods 112, not only when they approach but also immediately after they begin to move away from the transfer stations 99L, 99R. Otherwise, the fillers and the wrappers of the rods 112 would be subjected to undesirable twisting, flexing and/or other deforming stresses. By placing the transfer stations 99L, 99R in the zones where the paths of the sockets 330L, 330R are nearest to the path of tobacco rods 112, I insure that the sockets can approach the tobacco rods at the same rate and in the same positions in which they thereupon move away upon completed transfer of the mouthpieces. In this manner, I further insure that the sockets can remain close to the tobacco rods for a longer interval of time despite the fact that the conveyors including the chains 103L, 103R and the rotors 307L, 307R move continuously.

It is further clear that the chutes 331L, 331R may be positioned in a way to discharge the mouthpieces in positions other than radially with reference to the rotors 307L, 307R, as long as the sockets 330L, 330R are properly aligned with the discharge ends of such chutes during actual transfer of mouthpieces.

As stated in connection with FIGS. 1a and 1b, a single set of pasters normally suffices to insure satisfactory adherence of mouthpieces to the respective tobacco rods. Therefore, the pasters 340L, 340R may be omitted if the pasters 106L, 106R are present, or vice versa. In fact, both sets of pasters may be omitted if the frictional force between the mouthpieces and the extremities of the tobacco rods suffices to insure satisfactory engagement between the mouthpieces and the rods.

For the sake of clarity, the tobacco rods 112, the assemblies 113, and the mouthpieces 333L, 333R were omitted in both halves of FIG. 15. Also, FIG. 16 merely shows two sockets 330L and two sockets 330R. The mouthpieces 333L, 333R may be configurated in the same way as shown in FIG. 2a. Thus the internal diameter 17 of the cylindrical end of each mouthpiece may be slightly smaller than the diameter of an extremity before the latter is deformed by the molding unit but is slightly greater than the diameter of a molded or deformed extremity so that the latter can be readily inserted into the mouthpiece.

The assemblies 113 (see the upper part of FIG. 18) are conveyed against the cutting edge on the disk-shaped cutting device 108 which severs each tobacco rod midway between its extremities whereby each assembly 113 yields two finished cigars 114. The cigars 114 are lifted out of the pockets of the conveyor chains 103L, 103R and are deposited on the upper stringer of the transporting band 104 which conveys such articles to storage or to a packing station. The innate elasticity of tobacco rod fillers causes the tobacco which fills the extremities to expand, either completely or nearly completely, immediately or shortly after the assemblies 113 leave the stations 99L, 99R so that the mouthpieces are held with a requisite force and withstand all such treatments which are carried out in further processing of cigars 114 and/or during smoking.

Of course, the frictional engagement between the mouthpieces and the tobacco rods need not by itself suffice to insure proper retention of mouthpieces on the finished articles 114 because the apparatus can be provided with one or two sets of pasters to insure even stronger retention. The adhesive will penetrate into the pores at the inner side of a mouthpiece and at the outer side of a wrapper to prevent uncontrolled entry of false air when the cigar 114 is being smoked.

The main drive unit for the apparatus of FIGS. 3 to 18 is illustrated in FIG. 7. This main drive unit comprises a main drive shaft 400 which is mounted in the bearing brackets 119L, 119R carried by the frame 115. The shaft 400 is driven by the transmission of the cigar rod making machine which supplies tobacco rods 111 to the chute 100a of FIG. 4. This shaft carries two sprocket wheels 401L, 401R which drive the chains 103L, 103R, the sprocket wheels 203, 221 of the pasters 106L, 106R, and the sprocket wheel 123 which drives the drums 101, 102. The chains 103L, 103R are further trained around sprocket wheels 402L, 402R which are shown in FIG. 3 and are mounted on a shaft 403, the latter being rotatable in the brackets 117L, 117R. The main drive shaft 400 also carries a sprocket wheel 405 which drives the sprocket wheel 302 on the drive shaft 301 for the conveyors 107L, 107R. Still further, the shaft 400 carries a sprocket wheel which transmits motion to the transporting belt 104.

The bearing brackets 119L, 119R support one or more carriers 430 for two transverse horizontal shafts 431, 432 provided with pulleys 433, 434. The belt 104 is trained around the pulleys 433, 434 and the shaft 432 is driven by a sprocket wheel 435 for an endless chain 436 which receives motion from the main drive shaft 400 in a manner as mentioned above.

FIG. 7 further shows an inclined surface or chute 437 which serves to lift the cigars 114 out of the pockets of the chains 103L, 103R and to guide such cigars onto the upper stringer of the transporting belt 104. The inclination of the surface 437 may be such that the cigars 114 can roll by gravity as soon as they leave the cutting station. This cutting station accommodates the aforementioned disk-shaped cutting device 108 which is driven at a high speed, preferably by a separate prime mover, e.g., an electric motor which is not shown in the drawings. The numeral 438 denotes in FIG. 7 a grinding wheel which may be moved into engagement with the cutting device 108 to sharpen the cutting edge at requisite intervals.

As stated before, the apparatus of my invention is capable of connecting mouthpieces with the extremities of cigar rods 6 or 111, but the same apparatus or the same type of apparatus (with minor modifications as regards the dimensioning of pockets and/or sockets, the expanders, etc.) can be used for applying mouthpieces to cigarillos, cheroots or cigarettes.

Referring finally to FIG. 19, there is shown a third apparatus wherein the molding units 502L, 502R are preceded by two drilling units 540L, 540R. The apparatus further comprises a source 514 of tobacco rods which may include a chute for feeding tobacco rods of multiple unit length into consecutive pockets or holders of a conveyor 501. The latter may include two endless chains corresponding to the chains 1L, 1R or 103L, 103R, or it may take the form of a rotary drum with axially parallel pockets. The drilling units 540L, 540R are adjacent to the extremities of the tobacco rods which travel with the conveyor 501 and are provided with instrumentalities which remove some tobacco from the filler ends. The thus treated tobacco rods then advance past the two molding units 502L, 502R where the extremities are compressed to assume a conical or semicircular shape. The tobacco rods thereupon travel between two pasters 507L, 507R which coat the molded extremities with films of adhesive, and the thus coated extremities are then provided with mouthpieces which are supplied by two conveyors 508L, 508R. A cutting device 526 is located downstream of the mouthpiece conveyors 508L, 508R and serves to subdivide each tobacco rod into two sections each of which carries a mouthpiece, it being assumed that the tobacco rods are of double unit length. If the tobacco rods are of unit length, the units 540R, 502R, 507R, 508R or 540L, 502L, 507L, 508L may be replaced by a single backup device which holds the tobacco rods against axial movement while the rods travel sideways with the conveyor 501. In such simplified apparatus, the cutting device 526 may be dispensed with.

A suitable drilling unit which may be used in the apparatus of FIG. 19 is disclosed, for example, in U.S. Patent No. 3,205,899 to Ackermann. The purpose of the units 540L, 540R is to remove from the extremities of consecutive tobacco rods such quantities of tobacco that, upon deformation in the molding units 502L, 502R, the density of each extremity is the same or nearly the same as the density of the remainder of the tobacco rod. In other words, such drilling of tobacco rods insures that the flow of smoke is not affected by the molding operation which is carried out by the units 502L, 502R. The aforementioned patent to Ackermann also discloses suitable molding units which may be used in the apparatus of FIG. 19. It is to be noted that the provision of the drilling units 540L, 540R constitutes a safety measure because, in many instances, the extremities of tobacco rods which are treated in the apparatus of FIGS. 3–18 can expand sufficiently subsequent to introduction into mouthpieces to insure satisfactory flow of smoke.

The operation of the apparatus which is shown in FIG. 19 will be readily understood. The source 514 feeds tobacco rods of double unit length at regular intervals so that the rods enter consecutive pockets or holders of the conveyor 501 which latter preferably operates continuously and at a constant speed. The drilling units 540L, 540R remove tobacco from the end faces of the tobacco rods so that each extremity is provided with a conical or semispherical recess, preferably in such a way that the wrappers are not damaged. The molding units 502L, 502R compress the extremities to such an extent that the recesses disappear whereby each extremity resembles a cone or a portion of a sphere. This results in requisite reduction in the transverse dimensions of the extremities so that such extremities can be readily introduced into the mouthpiece ends. The bond between the tobacco rods and the respective mouthpieces is enhanced by adhesive applied by the pasters 507L, 507R which are mounted in zones located upstream of the two transfer stations, such transfer stations being provided in the regions where the conveyors 508L, 508R deliver mouthpieces into the path of the tobacco rods which are moved sideways by the conveyor 501. The pasters 507L, 507R may be constructed in a manner as shown in FIGS. 8 to 10.

A very important advantage of the apparatus which is shown in FIG. 19 is that all of the units are adjacent to a single conveyor 501. Thus, instead of placing the molding units 502L, 502R upstream of the point where the conveyor 501 receives tobacco rods from the source 514, such molding units are located downstream of this point. Additional pasters may be provided to inject or to otherwise apply adhesive to the mouthpieces while the mouthpieces travel with the conveyors 508L, 508R or even before. Such pasters may be provided in addition to or as substitutes for the pasters 507L, 507R.

It is further to be noted that certain features of the apparatus which is shown in FIGS. 1a and 1b may be combined with certain features of the apparatus which is shown in FIGS. 3–18 or in FIG. 19. Thus, while FIGS. 1a and 1b show an apparatus wherein the internal diameters of prefabricated mouthpieces 11L, 11R exceed the diameters of extremities 6b on the tobacco rods 6, at least at the time when the mouthpieces are actually applied to the tobacco rods, FIGS. 3–19 illustrate two types of apparatus wherein the internal diameters of prefabricated mouthpieces are smaller than the diameters of extremities on the tobacco rods and wherein the extremities must be compressed to be readily insertable into the mouthpieces. The apparatus of FIGS. 1a and 1b may be provided with two molding units for the extremities 6b or with two drilling units and with two molding units so that the mouthpieces 11L, 11R are expanded and the extremities 6b are compressed in zones located ahead of the transfer stations 108L, 108R. Analogously, the apparatus of FIGS. 3–18 or of FIG. 19 may be provided with expanders for the mouthpieces 333L, 333R so that the mouthpieces are mechanically expanded before they reach the stations 99L, 99R. Such expanders may be provided in addition to the molding unit of FIGS. 5 and 6 or in addition to the units 540L, 540R and 502L, 502R of FIG. 19. In such apparatus, proper insertion of tobacco rods into the ends of mouthpieces will be guaranteed by a relatively small expansion of mouthpieces and by a relatively small compression of the extremities.

The pasters 7L, 7R and/or 27L, 27R may be replaced by reciprocable pasters which move toward and away from the extremities 6b or toward and away from the mouthpieces 11L, 11R in synchronism with the operation of conveyors 1L, 1R and 8L, 8R. If the conveyors operate continuously, such reciprocable pasters must perform composite movements toward and away from the respective conveyors and also in the direction of movement of such conveyors. The same holds true for the pasters 106L, 106R, 340L, 340R, 507L and 507R.

The sockets of the conveyors 8L, 8R, 107L, 107R, 508L and 508R may be filled with mouthpieces by hand. However, it is preferred to provide the magazines 9L, 9R or 109L, 109R and to further provide automatic feed units which can supply mouthpieces, in proper orientation, to the corresponding conveyors at a rate corresponding to the rate at which the mouthpieces are being applied to the tobacco rods 6 or 112.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. An apparatus for assembling two types of prefabricated articles which respectively constitute mouthpieces and tobacco rods and wherein, during assembly, the internal diameter of one end of the mouthpiece at least equals the diameter of one extremity of the tobacco rod, comprising a first conveyor for moving articles of one type sideways and past a transfer station; and a second conveyor for moving articles of the second type in a predetermined path which also extends before and past said station and wherein the articles move sideways and are axially aligned throughout said predetermined path with the articles of said one type, at least one of said conveyors comprising means for moving the respective articles at said transfer station axially toward the articles on the other conveyor so that said one extremity of each consecutive tobacco rod enters said one end of the aligned mouthpiece.

2. An apparatus as set forth in claim 1, wherein said conveyors are arranged to move the respective articles continuously, at least while the articles are moved past said transfer station.

3. An apparatus as set forth in claim 2, wherein each of said conveyors comprises equidistant holder means for the respective articles.

4. An apparatus as set forth in claim 3, wherein said one conveyor is said second conveyor and wherein the holder means of said second conveyor are arranged to travel along an endless path which includes said predetermined path.

5. An apparatus as set forth in claim 4, wherein said second conveyor comprises a rotor rotatable about a fixed axis and the holder means of said second conveyor includes sockets having open sides which face away from said fixed axis during travel past said transfer station, the holder means of said first conveyor being substantially coplanar with the holder means of said second conveyor, at least during travel past said transfer station.

6. An apparatus as set forth in claim 1, further comprising backup means for holding the articles on said other conveyor against axial movement during travel past said transfer station.

7. An apparatus as set forth in claim 6, wherein the tobacco rods are of multiple unit length and are moved by said other conveyor, said backup means comprising a third conveyor which is mirror symmetrical to said one conveyor with reference to said other conveyor and is arranged to apply mouthpieces to the other extremities of consecutive tobacco rods.

8. An apparatus as set forth in claim 6, wherein the tobacco rods are of multiple unit length and wherein said backup means comprises a third conveyor for applying mouthpieces to the other extremities of consecutive tobacco rods at a second transfer station, said other conveyor being disposed between said one conveyor and said third conveyor.

9. An apparatus as set forth in claim 8, further comprising a cutting device for subdividing each tobacco rod into a plurality of sections two of which are provided with mouthpieces, said cutting device being located downstream of said transfer stations.

10. An apparatus as set forth in claim 2, further comprising paster means for applying adhesive to said one extremity of each consecutive tobacco rod, said paster means being adjacent to the conveyor for tobacco rods and being located upstream of said transfer station.

11. An apparatus as set forth in claim 2, further comprising paster means for applying adhesive to the interior of said one end of each consecutive mouthpiece, said paster means being adjacent to the conveyor for mouthpieces and being located upstream of said transfer station.

12. An apparatus as set forth in claim 11, wherein said paster means comprises means for injecting sprays of liquid adhesive into the ends of said mouthpieces.

13. An apparatus as set forth in claim 11, wherein said paster means comprises applicator means reciprocable axially of the mouthpieces and arranged to enter the ends of such mouthpieces for applying coats of adhesive thereto.

14. An apparatus as set forth in claim 2, wherein said tobacco rods contain deformable fillers and, in the prefabricated condition thereof, the diameters of said extremities exceed the internal diameters of said mouthpiece ends, and further comprising molding means adjacent to the conveyor for tobacco rods for compressing said extremities in a zone located upstream of said transfer station so that the thus compressed extremities can readily enter the mouthpiece ends.

15. An apparatus as set forth in claim 14, wherein said fillers consist of elastically deformable material and wherein said molding means is arranged to effect temporary compression of said extremities so that such extremities expand subsequent to entry into said mouthpieces.

16. An apparatus as set forth in claim 2 wherein, in the prefabricated condition thereof, the internal diameters of said mouthpiece ends are smaller than the diameters of said extremities, and further comprising expander means adjacent to the conveyor for mouthpieces and located upstream of said transfer station for expanding the ends of consecutive mouthpieces.

17. An apparatus as set forth in claim 16, wherein said expander means comprises means for temporarily expanding the ends of mouthpieces.

18. An apparatus as set forth in claim 16, further comprising compressing means located downstream of said transfer station for compressing the expanded mouthpiece ends into frictional engagement with the respective extremities.

19. An apparatus as set forth in claim 2, wherein said one conveyor comprises a rotor rotatable about a fixed axis, a plurality of equidistant sockets for mouthpieces, and pivot means securing said sockets to said rotor for rotation about axes which are parallel with said fixed axis.

20. An apparatus as set forth in claim 19, wherein said one conveyor further comprises cam means and follower means connected with said sockets and arranged to track said cam means for maintaining said sockets in alignment with the corresponding tobacco rods while the sockets travel past said transfer station, said transfer station being located in a zone where said sockets move nearest to said other conveyor.

21. An apparatus as set forth in claim 19, wherein said one conveyor further comprises cam means and follower means provided on said sockets and arranged to track said cam means, said sockets having open sides facing the extremities of tobacco rods during travel past said transfer station and said cam means being arranged to maintain the mouthpieces in said sockets in axial alignment with the respective tobacco rods while the sockets travel past said transfer station, said station being provided in a zone where said sockets move nearest to said other conveyor.

22. An apparatus as set forth in claim 19, further comprising fixed cam means and follower means tracking said cam means and connected with said sockets for pivoting the sockets in response to rotation of said rotor about said fixed axis.

23. An apparatus as set forth in claim 19, further comprising means for introducing mouthpieces into consecutive sockets by gravity feed, each of said sockets having an open upper side for reception of mouthpieces and an open outer side which faces said other conveyor during travel past said transfer station so that the mouthpiece may be withdrawn through said outer side.

24. An apparatus as set forth in claim 2, further comprising means for feeding the articles to the respective conveyors.

25. An apparatus as set forth in claim 2 wherein, in the prefabricated condition thereof, the diameters of said extremities exceed the internal diameters of said mouthpiece ends, and further comprising drilling means located upstream of said transfer station for removing material from said extremities and molding means for compressing the thus drilled extremities upstream of said transfer station so that such extremities can readily enter the ends of mouthpieces.

26. An apparatus for assembling mouthpieces with tobacco rods of the type wherein, during assembly, the internal diameter of one end of the mouthpiece at least equals the diameter of one extremity of the tobacco rod, comprising a first conveyor having equidistant holders arranged to move the tobacco rods sideways and past a transfer station; a feed for supplying tobacco rods into consecutive holders of said conveyor; drilling means adjacent to said conveyor and located downstream of said feed for drilling a recess into one extremity of each tobacco rod; molding means located downstream of said drilling means for compressing the drilled extremities of tobacco rods; a paster located downstream of said molding means for applying adhesive to the thus compressed extremities of tobacco rods; and a second conveyor located downstream of said paster for moving the mouthpieces in a predetermined path which also extends before and past said transfer station and wherein the mouthpieces move sideways and are axially aligned throughout said predetermined path with the corresponding tobacco rods, said second conveyor comprising means for moving the mouthpieces at said transfer station axially toward the adhesive-coated extremities of tobacco rods so that such extremities enter the ends of the aligned mouthpieces.

27. An apparatus as set forth in claim 26, further comprising second drilling, molding and paster means for treating the other extremities of tobacco rods and a third conveyor for applying mouthpieces to such other extremities, said second drilling, molding and paster means and said third conveyor being mirror symmetrical to said first named drilling, molding and paster means and to said second conveyor with reference to said first conveyor.

28. An apparatus as set forth in claim 27, wherein said tobacco rods are of multiple unit length and further comprising cutting means located downstream of said station for subdividing successive tobacco rods into a plurality of sections two of which are provided with mouthpieces.

29. A method of assembling two types of prefabricated articles which respectively constitute mouthpieces and wrapped tobacco rods, comprising the steps of moving an article of each type sideways and in axial alignment with each other for a distance before and after a transfer station; and at said transfer station moving at least one of the two articles axially toward the other article so that one extremity of the tobacco rod enters the adjoining end of the mouthpiece.

30. A method as set forth in claim 29, wherein said articles are moved continuously while said one article moves axially toward the other article.

31. A method as set forth in claim 29, wherein the mouthpiece is moved axially toward the tobacco end.

32. A method as set forth in claim 31, wherein said tobacco rod is of multiple unit length and further comprising the steps of moving a second mouthpiece sideways and in axial alignment with the tobacco rod so that the tobacco rod is disposed between the two mouthpieces, and moving the second mouthpiece axially toward the tobacco rod at the same rate as said first named mouthpiece so that the other extremity of the tobacco rod enters the end of the second mouthpiece.

33. A method as set forth in claim 32, wherein said tobacco rod is of double unit length and further comprising the step of severing the tobacco rod midway between said extremities thereof so that the rod yields two sections of unit length each of which is assembled with one of said mouthpieces.

34. A method as set forth in claim 30, wherein the internal diameter of said end of the mouthpiece exceeds the diameter of said extremity and further comprising the step of changing one of said diameters to such an extent that said extremity fits snugly into said end of and is thereby connected with the mouthpiece.

35. A method as set forth in claim 30, wherein the internal diameter of said end of the mouthpiece is less than the diameter of said extremity and further comprising the step of compressing said extremity to effect temporary reduction in the diameter of such extremity during entry into the end of said mouthpiece.

36. A method as set forth in claim 30, wherein the internal diameter of said end of the mouthpiece exceeds the diameter of said extremity and further comprising the step of deforming said end radially inwardly and around said extremity so as to provide a permanent connection between the mouthpiece and the tobacco rod.

37. A method as set forth in claim 36, wherein said mouthpiece consists of thermoplastic material and wherein, in the prefabricated state thereof, the end of said mouthpiece has a diameter which at most equals the diameter of said extremity, and further comprising the steps of heating the mouthpiece to deformation temperature of its material and thereupon expanding said end while the material of the mouthpiece is in deformable state and to such an extent that the internal diameter of said end exceeds the diameter of said extremity before the latter enters the mouthpiece, said deforming step including mechanically compressing said end while the material of the mouthpiece is still in deformable state.

38. A method as set forth in claim 30, wherein said mouthpiece consists of thermoplastic material which has a tendency to expand in response to heating and contracts in response to cooling and wherein, in prefabricated state thereof, said end of the mouthpiece has an internal diameter which at most equals the diameter of said extremity, and further comprising the steps of heating the end of the mouthpiece to a temperature at which it can readily receive said extremity and cooling said end subsequent to entry of said extremity so that the material of the mouthpiece contracts and adheres to the tobacco rod.

39. A method as set forth in claim 29, wherein the internal diameter of said one end of the mouthpiece is less than the diameter of said extremity, and further comprising the steps of removing material from the interior of said extremity, and compressing the extremity to effect a reduction of its diameter for convenient entry into the mouthpiece end.

References Cited

UNITED STATES PATENTS

| | | | |
|---|---|---|---|
| 1,830,446 | 11/1931 | Schunemann | 131—88 |
| 2,827,904 | 3/1958 | Halstead | 131—88 |
| 2,981,262 | 4/1961 | Farkas | 131—88 |
| 3,007,476 | 11/1961 | Baugher et al. | 131—88 |
| 3,097,654 | 7/1963 | Carlson | 131—88 |

HUGH R. CHAMBLEE, *Primary Examiner.*